US012338660B2

(12) United States Patent
Claeys et al.

(10) Patent No.: US 12,338,660 B2
(45) **Date of Patent: *Jun. 24, 2025**

(54) SECURITY TAG WITH UNLOCKING ASSEMBLY

(71) Applicant: Sensormatic Electronics, LLC, Boca Raton, FL (US)

(72) Inventors: Patrick Claeys, Weston, FL (US); Sergio M. Perez, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/358,792

(22) Filed: Jul. 25, 2023

(65) Prior Publication Data

US 2024/0026712 A1 Jan. 25, 2024

Related U.S. Application Data

(63) Continuation of application No. 17/826,893, filed on May 27, 2022, now Pat. No. 11,739,567, which is a (Continued)

(51) Int. Cl.

| | |
|---|---|
| ***E05B 73/00*** | (2006.01) |
| ***E05B 47/00*** | (2006.01) |
| ***G08B 13/24*** | (2006.01) |

(52) U.S. Cl.
CPC ...... *E05B 73/0017* (2013.01); *E05B 47/0001* (2013.01); *E05B 47/0002* (2013.01); (Continued)

(58) Field of Classification Search
CPC ............. E05B 73/0017; E05B 47/0002; G08B 13/2434
See application file for complete search history.

(56) References Cited

U.S. PATENT DOCUMENTS 8,251,581 B2 * 8/2012 Clothier ................. H05B 6/062 374/176
10,134,209 B2 11/2018 Favier et al.
(Continued)

FOREIGN PATENT DOCUMENTS

DE 102005032932 A1 * 2/2007 ......... E05B 73/0017
EP 2119858 A1 11/2009

OTHER PUBLICATIONS

Extended European Search Report issued in corresponding European Application No. 23 215 734.7 dated Mar. 6, 2024.

*Primary Examiner* — John A Tweel, Jr.
(74) *Attorney, Agent, or Firm* — ArentFox Schiff LLP

(57) ABSTRACT

An electronic article surveillance tag with a tag body, a locking member, and unlocking member. The locking member is within the tag body and can receive and releasably engage with a pin portion of a connecting member and lock the connecting member to the tag body. The locking member includes a clutch mechanism movable between a first position in fixed engagement with the pin portion and corresponding to a locked state and a second position corresponding to an unlocked state that allows detachment of the pin portion from the locking member. The clutch mechanism further includes a plunger member formed from a non-ferromagnetic material. The unlocking member is fully encased within the tag body and movement of the unlocking member from a locked position to an unlocked position moves the clutch mechanism between the first position corresponding to the locked state and the second position corresponding to the unlocked state.

20 Claims, 21 Drawing Sheets

Related U.S. Application Data continuation of application No. 16/923,918, filed on Jul. 8, 2020, now Pat. No. 11,505,969.

(60) Provisional application No. 62/871,652, filed on Jul. 8, 2019, provisional application No. 62/871,656, filed on Jul. 8, 2019, provisional application No. 62/871,646, filed on Jul. 8, 2019, provisional application No. 62/871,650, filed on Jul. 8, 2019.

(52) U.S. Cl.
CPC ...... *E05B 47/0009* (2013.01); *E05B 47/0012* (2013.01); *G08B 13/2434* (2013.01)

(56) References Cited

U.S. PATENT DOCUMENTS

| | | | | |
|---|---|---|---|---|
| 11,505,969 | B2 * | 11/2022 | Claeys | E05B 47/0012 |
| 11,739,567 | B2 * | 8/2023 | Claeys | E05B 47/0012<br>340/301 |
| 2016/0027271 | A1 | 1/2016 | Paul et al. | |
| 2016/0321894 | A1 | 11/2016 | Schneider | |

* cited by examiner

SECURITY TAG WITH UNLOCKING ASSEMBLY

RELATED APPLICATIONS

This application claims priority to, and the benefit of U.S. patent application Ser. No. 17/826,893 filed May 27, 2022, which is a continuation of U.S. patent application Ser. No. 16/923,918 filed Jul. 8, 2020, now U.S. Pat. No. 11,505,969, which claims priority to U.S. Provisional Patent Application Nos. 62/871,646, 62/871,650, 62/871,652, and 62/871,656, all filed Jul. 8, 2019. The entirety of the contents of each of the preceding applications are incorporated herein by reference, as if fully set forth in this document, for all purposes.

TECHNICAL FIELD

Aspects of the present disclosure are directed to security tags for attachment to articles, and more particularly related to electronic security tags having a body for housing one or more sensors, where a mated tack pin is used for attachment to an article.

Further, aspects of the present disclosure generally relate to electronic security tags used in Electronic Article Surveillance ("EAS") systems for preventing the unauthorized removal of articles from a given location (e.g., a retail store). More particularly, this disclosure relates to an improved security tag, and a novel, non-magnetic method and apparatus for releasing the tag.

BACKGROUND

A typical EAS system in a retail setting may comprise a monitoring system and at least one security tag or marker attached to an article to be protected from unauthorized removal. The monitoring system establishes a surveillance zone in which the presence of security tags and/or markers can be detected. The surveillance zone is usually established at an access point for the controlled area (e.g., adjacent to a retail store entrance and/or exit). If an article enters the surveillance zone with an active security tag and/or marker, then an alarm may be triggered to indicate possible unauthorized removal thereof from the controlled area. In contrast, if an article is authorized for removal from the controlled area, then the security tag and/or marker thereof can be detached therefrom. Consequently, the article can be carried through the surveillance zone without being detected by the monitoring system and/or without triggering the alarm.

To be effective, security tags need to be affixed to the article in such a way that removal is extremely difficult without the use of detachment tools specifically designed for the particular tag. Security tags and their associated detachers are designed to ensure that the mechanics of the detacher cannot be easily duplicated or otherwise improvised to defeat the tag. To this end, the detaching mechanism is often designed to exert an extremely strong and precisely-targeted force on portions of the tag such that the force imparted on the tag is almost impossible to manually replicate.

One type of security tag uses a magnetic locking mechanism which is releasable by a magnetic force, which may be from an either a permanent magnet or an electro-magnet. Typically, this type of security tag has a tag body and a separate tack pin which is insertable into the tag body. In this type of tag, a retaining mechanism inside the tag body prevents the unauthorized withdrawal of the pin from the tag body. A drawback of this type of tag is that it can be defeated if the tag is subjected to a magnetic field of sufficient strength.

The standard 3-ball clutch locking mechanism is widely used across the security tag industry due to its mechanical simplicity and defeat resistance benefits. As well all known 3-ball clutches typically use a magnet to detach the mechanism. This results in a very constrained design envelope and fixed direction for pin/tag function.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides a design that results in a change in the method by which 3-ball clutches can be detached, in particular, by no longer requiring magnetic materials and magnetic detachers and/or by changing a direction of a detachment force to allow a tack pin to be detached from the 3-ball clutch. For example, the present disclosure also allows for perpendicular orientation of the mechanism that detaches the tack pin from the body of the tag, thereby internally opening tag geometry/design options. The apparatus and methods of the present disclosure may be utilized in electronic tags, which may be referred to as an electronic security tag, an electronic article surveillance (EAS) tag, or a loss prevention (LP) tag.

In one example, an electronic security tag which is attachable to an item may include a tag body member, a connecting member having a pin portion releasably engageable with the tag body member, the pin portion extending along a first axis. The tag further includes a locking member to lock the connecting member to the tag body member, wherein the locking member includes a clutch mechanism movable along a second axis parallel to the first axis between a first position in contact with the pin portion and corresponding to a locked state and a second position corresponding to an unlocked state, the clutch mechanism including at least one member formed from a non-ferromagnetic material.

In one aspect, the aforementioned security tag may be part of an electronic surveillance system, which may further include a detacher for causing the unlocking member to move from the locked position to the unlocked position when the tag is placed within, on, and/or within proximity of the detacher.

In another aspect, the disclosed aspect use a 3-ball clutch system (3 balls, plunger, bell, and spring) and allow for a detachment perpendicular to the pin insertion direction. Further, the aspects comprise a housing for the 3-ball clutch components that acts as a support structure for the wedge mechanism that drives the plunger to release the 3-ball lock. In one example, the wedge mechanism described herein is driven/moved by a shape-memory alloy ("SMA"), however, other devices of driving a perpendicularly detached 3-ball clutch can be utilized in accordance with the principles of the disclosure. For example, the SMA is a cost effective solution, as is an electro-mechanical actuator.

For example, an implementation includes an electronic article surveillance tag comprising a tag body member and a connecting member having a pin portion releasably engageable with the tag body member, the pin portion extending along a first axis. The tag further includes a locking member attached to the tag body member and configured to receive the pin portion to lock the connecting member to the tag body member, wherein the locking member includes a clutch mechanism movable parallel to the first axis between a first position in fixed engagement with the pin portion and corresponding to a locked state and a second position corresponding to an unlocked state that allows detachment of the pin portion from the locking member, the clutch mechanism including a plunger member formed from a non-ferromagnetic material and having a first contact surface. Further, the tag includes an unlocking member slidably engaged with the tag body member and moveable along a second axis perpendicular to the first axis between a locked position and an unlocked position, wherein the unlocking member includes a second contact surface that contacts the first contact surface during movement between the locked position and the unlocked position to move the clutch mechanism between the first position corresponding to the locked state and the second position corresponding to the unlocked state. Additionally, the tag includes an actuator connected to the unlocking member and configured to move the unlocking member from the locked position to the unlocked position.

In one example, an electronic article surveillance tag may include a tag body, a locking member, and an unlocking member. The locking member is within the tag body and can receive and releasably engage with a pin portion of a connecting member and lock the connecting member to the tag body. The locking member includes a clutch mechanism movable between a first position in fixed engagement with the pin portion and corresponding to a locked state and a second position corresponding to an unlocked state that allows detachment of the pin portion from the locking member. The clutch mechanism further includes a plunger member formed from a non-ferromagnetic material. The unlocking member is fully encased within the tag body and movement of the unlocking member from a locked position to an unlocked position moves the clutch mechanism between the first position corresponding to the locked state and the second position corresponding to the unlocked state.

A further example implementation includes an electronic article surveillance tag, comprising a tag body member and a connecting member having a pin portion releasably engageable with the tag body member, the pin portion extending along a first axis. The tag also includes a locking member attached to the tag body member and configured to receive the pin portion to lock the connecting member to the tag body member, wherein the locking member includes a clutch mechanism movable parallel to the first axis between a first position in fixed engagement with the pin portion and corresponding to a locked state and a second position corresponding to an unlocked state that allows detachment of the pin portion from the locking member, the clutch mechanism including a plunger member formed from a non-ferromagnetic material. Additionally, the tag includes an unlocking member attached to the tag body member and moveable along a second axis perpendicular to the first axis between a locked position and an unlocked position, wherein during movement between the locked position and the unlocked position, the unlocking member moves the clutch mechanism between the first position corresponding to the locked state and the second position corresponding to the unlocked state, wherein the unlocking member includes an unlocking body formed from a ferromagnetic material configured to move the unlocking member from the locked position to the unlocked position in response to a magnetic field.

In another example, the apparatus and methods comprise a housing for the 3-ball clutch components that acts as a support structure for a rotating cam that drives the plunger to release the 3-ball lock. In one example, the rotating cam described herein is driven/moved by a SMA wire, however, other means of driving a perpendicularly detached 3-ball clutch can be utilized in accordance with the principles of the disclosure.

More specifically, one example implementation includes an electronic security tag attachable to an item comprising a tag body member and a connecting member having a pin portion releasably engageable with the tag body member, the pin portion extending along a first axis. The tag further includes a locking member to lock the connecting member to the tag body member, wherein the locking member includes a clutch mechanism movable parallel to the first axis between a first position in contact with the pin portion and corresponding to a locked state and a second position corresponding to an unlocked state, wherein the clutch mechanism includes a plunger member comprising a plurality of first protrusions. Additionally, the tag includes a rotational drive member comprising a plurality of second protrusions configured to interoperate with the plurality of first protrusions, wherein the rotational drive member is rotatable in a plane perpendicular to the first axis to move the plunger in a direction parallel to the first axis.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
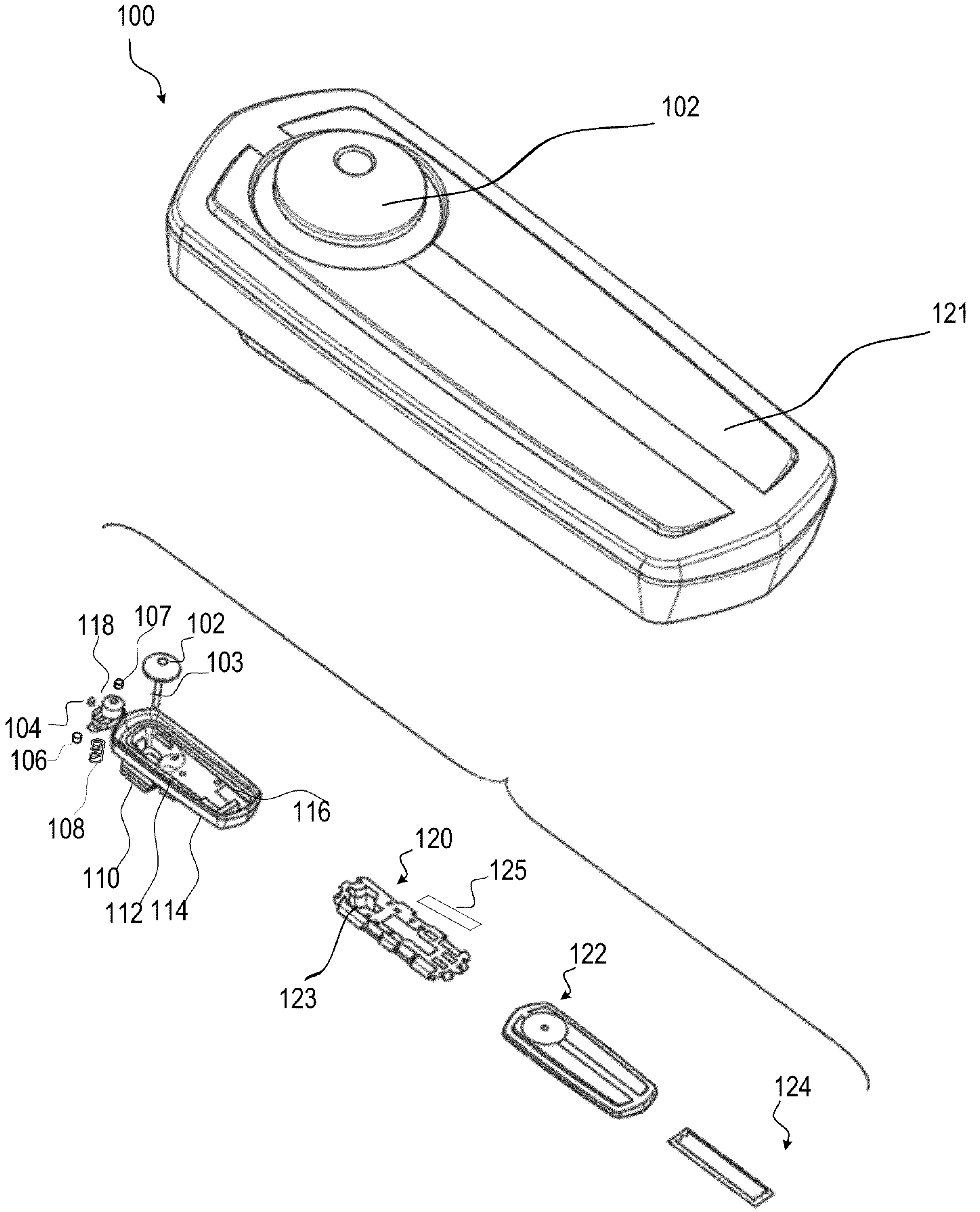
FIG. 1 is perspective view, with an inset exploded view, of an example of an electronic security tag in accordance with aspects of the present disclosure.

Traditional three-ball clutch assemblies used in security tags rely on magnetic forces to release the locking mechanism of the system. This requires most or all of the parts within the three-ball clutch to be manufactured from ferromagnetic materials. These materials tend to be heavy and expensive relative to polymer counterparts. Another drawback of a security tag using magnetic force to release locking mechanism of a tag is that it can be defeated if the tag is subjected to a magnetic field of sufficient strength. The disclosed electronic security tag, also referred to as an electronic article surveillance (EAS) tag, or a loss prevention (LP) tag, includes a non-magnetic three-ball clutch that can be generally applied to any tag architecture regardless of the method of retracting to release the mechanism (e.g., perpendicular magnetic lever arm, motor or linear solenoid, shape memory alloy (SMA) actuator, etc.).

The apparatus of the present application includes an electronic security tag which can overcome issues concerning current three-ball clutch mechanisms. Currently electronic security tags use ferromagnetic materials, which are relatively heavy and expensive materials. Currently, electronic security tags are pre-loaded and may be bound due the locking nature of the pin, bell and balls, and because the magnetic force acting on the entire system is not strong enough to draw down the three ball bearings. Further, the electronic security tags may be defeatable using a strong magnet. Also, current electronic security tag components are prone to negative effects such as corrosion, defeat by slamming the magnetic materials, etc. An electronic security tag without the constant need for a magnetic release also allows for a stainless steel spring and stainless steel ball bearings to add additional magnetic defeat and corrosion resistance. Further, a three-ball clutch mechanism that is drawn down forcefully using a ball captivation mechanism or cap, as described herein, allows the tag to release in any orientation-pin up, down, or any angle in between. The electronic security tag of the present application also offers the ability to operate the 3-ball clutch using an internal drive mechanism (for example, a SMA wire, a rotational drive, an electro-mechanical drive), which enables the electronic security tag described herein to be a self-detaching device.

Additionally, in one or more of the aspects described herein, the tag can be opened with no direct contact with a detacher. In other words, placing the tag in an electronic field or having the tag receive a wireless control request signal can be methods used to verify and open the tag.

Further, in one or more of the aspects described herein, and unlike existing magnetically-actuated detaching designs, an orientation of the tag when detaching the pin is not critical.

Moreover, in one or more of the aspects described herein, the tag may be configured as a one-piece or unitary structure, e.g., where the pin and lock/unlock mechanism is connected together as one piece, which can be easier for self-detaching or self-check-out use cases.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Referring to FIG. 1, an example electronic security tag 100 includes a connecting member 102 that is releasably engageable with a tag member 121 that enables the electronic security tag 100 to be releasably attachable to an article to enable tracking of the article in a security system. For example, the connecting member 102 includes a tack body having a pin portion 103 extending therefrom. The tag member 121 includes a lower housing member 114 and an upper housing member 122 that encase a tag body member 120 that houses a locking member configured to releasably secure the pin portion 103 of the connecting member 102. The locking member includes a bell and plunger assembly 118 and a clutch spring 108 that are mounted within a well portion 123 that extends from the tag body member 120. The clutch spring 108 applies a biasing force to the plunger member of the bell and plunger assembly 118 to bias the plunger toward a locked state that engages the pin portion 103, and to resist movement to an unlocked state that allows the pin portion 103 to be detached from the tag member 121. For example, the bell and plunger assembly 118 includes a plunger member that contains balls 104, 106 and 107 within a bell member to define a three-ball clutch mechanism (as described below with reference to FIG. 3). The balls 104, 106 and 107 may be steel balls, or balls made of other rigid material. Notably, the plunger member may be formed from a substantially non-ferromagnetic material, such as a plastic or composite material, such that placing a magnet below the bell and plunger assembly 118 will not cause the plunger member and the balls to move into an unlocked state relative to the pin portion 103. The bell and plunger assembly 118 is further described with reference to FIGS. 2 and 3 below. Additionally, the electronic security tag 100 includes a label 124, which may be an acousto-magnetic label, a radio frequency identification (RFID) label, or both, mounted to the tag body member 120. For example, the acousto-magnetic label may include one or more strips of amorphous metal and a strip of ferromagnetic material with the strips not bound together and free to oscillate mechanically.

Optionally, the electronic security tag 100 may include an electrical controller 125 that may be used to control operation of the electronic security tag 100 and/or operation of an unlocking mechanism to move the locking member to the unlocked state. The electrical controller 125 may include one or any combination of a processor, a memory, a circuit board, a circuit, a battery, an antenna, a motor/solenoid drive having a gear and/or lead screw, etc. For example, the electrical controller 125 can respond to a control request signal from another device, such as a point of sale device, a mobile phone, a wireless router, etc., and generate a control signal to actuate the unlocking mechanism to cause the unlocking mechanism to move the locking member to the unlocked state. In a further alternative or additional aspect, the electronic security tag 100 may include an energy pickup component 112 electrically connected to the electrical controller 125, which is configured to collect energy based on exposure to a magnetic field and/or based on wirelessly transmitted signals. For example, in one implementation, the energy pickup component 112 may be an electromagnetic receiver coil, e.g., an inductive coil, that is responsive to time-varying magnetic fields in the surrounding of the electronic security tag 100, and which generates energy upon exposure to such magnetic fields to drive the electrical controller 125 and/or the unlocking mechanism, as described below. In another implementation, for instance, the energy pickup component 112 may be one or more antennae or antenna arrays configured to receive wirelessly transmitted energy, such as but not limited to WiFi or radio frequency identification (RFID) radiation, which can be paired with energy harvesting circuitry in the electrical controller 125 to charge a battery or capacitor that resides in the tag.

For example, in one optional implementation that is described in more detail below, the electronic security tag 100 may include an unlocking mechanism in the form of a wedge member 110 that is moveable within the tag member 121, perpendicular to the longitudinal axis of the pin portion 103, to move the plunger member of the bell and plunger assembly 118 in a downward direction to enable the release the connecting member 102 from the tag member 121. Further, the unlocking mechanism may additionally include an actuator 116, such as a shape memory alloy (SMA) wire in this example, for driving the wedge member 110, e.g., providing an actuating force to the wedge member 110. For example, the actuating force may be a mechanical force on the plunger of the bell and plunger assembly 118 (as described below with reference to FIGS. 2 and 3) exerted by an external device, a pulling force exerted by a shape metal alloy (SMA) wire coupled to the plunger member; or a motive force exerted by an electric motor. It should be understood that the actuator 116 may take other forms, e.g., a mechanical force exerted by an external device, and/or may be integrated into or the same as the electrical controller 125 and/or the energy pickup component 112 discussed above.

Figure 2:
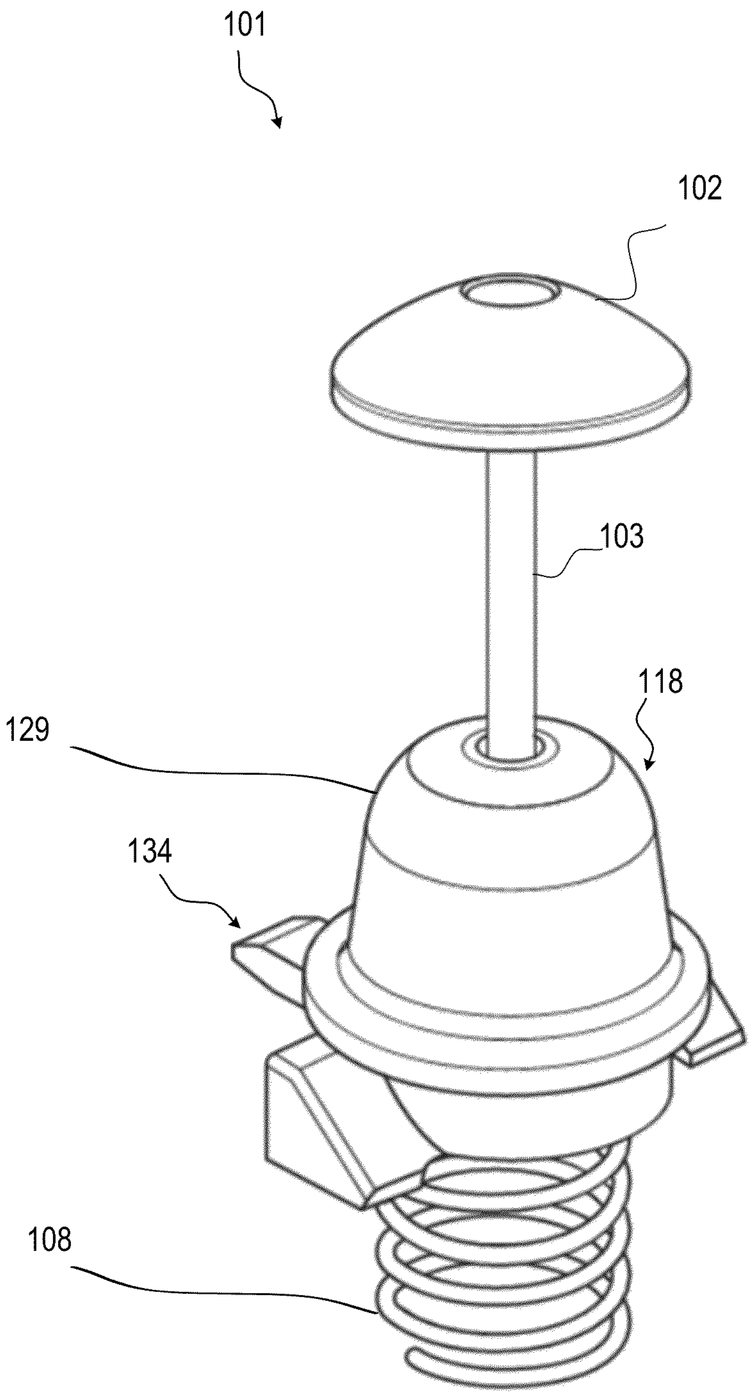
FIG. 2 is a perspective view of an example of a locking mechanism of an electronic security tag in accordance with aspects of the present disclosure.

Referring to FIG. 2, an example of a locking mechanism 101 of the electronic security tag 100 includes the connecting member 102 (as described above with reference to FIG. 1), and the bell and plunger assembly 118 that includes a bell member 129 and a plunger member 134 that moveably supports and holds the 3 balls of the 3-ball clutch within the bell member 129 to define the locking mechanism. The bell and plunger assembly 118 (described in detail with reference to FIG. 3 below), may receive the pin portion 103 of the connecting member 102 and firmly hold the pin portion 103 in a locked state so that it cannot be removed from the tag body 121 without actuation of an unlocking mechanism, as described herein. The bell member 129 of the bell and plunger assembly 118 may be bell-shaped having a closed top end and an inner surface defining an open bottom end configured to receive the plunger member 134 (as described below with reference to FIG. 3). The interaction of the connecting member 102, the bell and plunger assembly 118, and the clutch spring 108 is described below with reference to FIG. 3.

Figure 3:
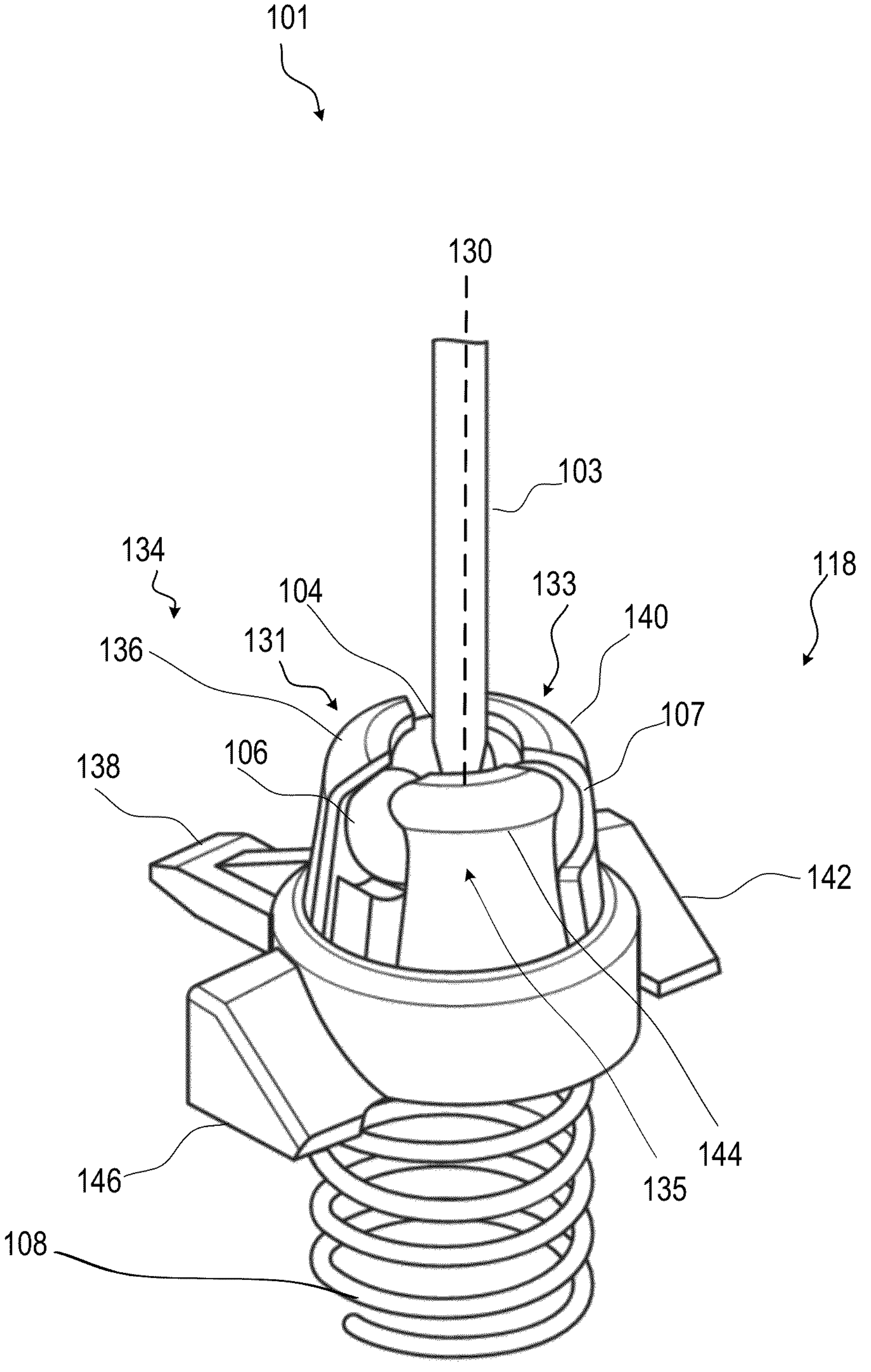
FIG. 3 is a perspective view similar to FIG. 2, but with a bell member of the locking mechanism removed to provide a view of a pin portion, balls and a plunger member in accordance with aspects of the present disclosure.

Referring to FIG. 3, the locking mechanism 101 (as described above with reference to FIG. 2) includes the bell and plunger assembly 118 (with bell member 129 removed for clarity) with the plunger member 134 configured to contain the balls 104, 106 and 107 so that the balls 104, 106 and 107 move up and down with the plunger member 134. The locking mechanism 101 may lock the connecting member 102 to the tag body member 122 in response to the biasing force provided by the clutch spring 108. The pin portion 103 of the connecting member 102 is movable along a first axis 130. The plunger member 134 containing the balls 104, 106 and 107 defines a clutch mechanism movable within the bell member 129 parallel to the first axis 130 between a first position in contact with the pin portion 103 and corresponding to a locked state (as described below with reference to FIG. 5) and a second position corresponding to an unlocked state (as described below with reference to FIG. 6), wherein the first position is closer to a top end of the bell member 129 than the second position. The plunger member 134 and balls 104, 106, and 107 in the second position, e.g., at the wider diameter of the bell member 129, may allow the pin portion 103 to be released from the three balls 104, 106 and 107 to allow removal of the pin portion 103 from the tag member 121.

The plunger member 134 may be substantially formed from a non-ferromagnetic material such that application of a magnetic field to the plunger member 134 does not cause the plunger member 134 to move from the first position corresponding to the locked state to the second position corresponding to the locked state. Further, the plunger member 134 may movably hold the three balls 104, 106 and 107 of the clutch mechanism. The three balls 104, 106 and 107 may be arranged in a circular manner to receive the pin portion 103 of the connecting member 102 (see, e.g., FIG. 4) and engage the pin portion 103 in the locked position (see, e.g., FIG. 5) to resist movement of the pin portion 103 away from the tag member 121. The plunger member 134 may include flange members 131, 133 and 135 that are spaced apart and configured to allow the balls 104, 106, and 107 to be inserted and contained within an internal chamber defined by the flange members 131, 133, and 135. The flange member 131 may include a distal end having an inwardly curved portion 136 that defines a first contact surface for holding at least one ball. The flange member 133 may include a distal end having an inwardly curved portion 140 defining a second contact surface for holding at least one ball. The flange member 135 may include a distal end having an inwardly curved portion 144 defining a third contact surface for holding at least one ball. In an implementation, the flange members 131, 133 and 135 may be circumferentially spaced apart to define three corresponding side openings sized to receive and hold the three balls 104, 106 and 107. The distal ends having an inwardly curved portions 136, 140 and 144 may move the three balls 104, 106 and 107 along with the plunger member 134 from the first position in contact with the pin portion 103 (as described below with reference to FIG. 5) to the second position corresponding to the unlocked state (as described below with reference to FIG. 6). Additionally, the plunger member 134 may include at least one contact surface, such as first and second contact surfaces 146 and 142, to receive a force, such as by movement of an unlocking mechanism, and to transfer at least a portion of the force to move the plunger member 134 parallel to the first axis 130 from the first position to the second position. For example, the contact surfaces 142 and 146 may be angled or inclined surfaces formed by a wedge member extending from the body of the plunger member 134, which may interact with an unlocking mechanism that moves perpendicular to first axis 130 to cause the plunger member 134 and the balls 104, 106, and 107 to move downward to the second position. Alternatively, the contact surfaces 142 and 146 may be horizontal or rounded surfaces that may interact with an unlocking mechanism, e.g., a ramp or wedge-shaped member, that moves perpendicular to first axis 130 to cause the plunger member 134 and the balls 104, 106, and 107 to move downward to the second position. In a further optional aspect, the plunger member 134 may additionally include a guiding member 138 that can interact with a slot in the well portion 123 of the tag body member 120 in order to resist rotation of the plunger member 134 as it moves along the first axis 130.

Figure 4:
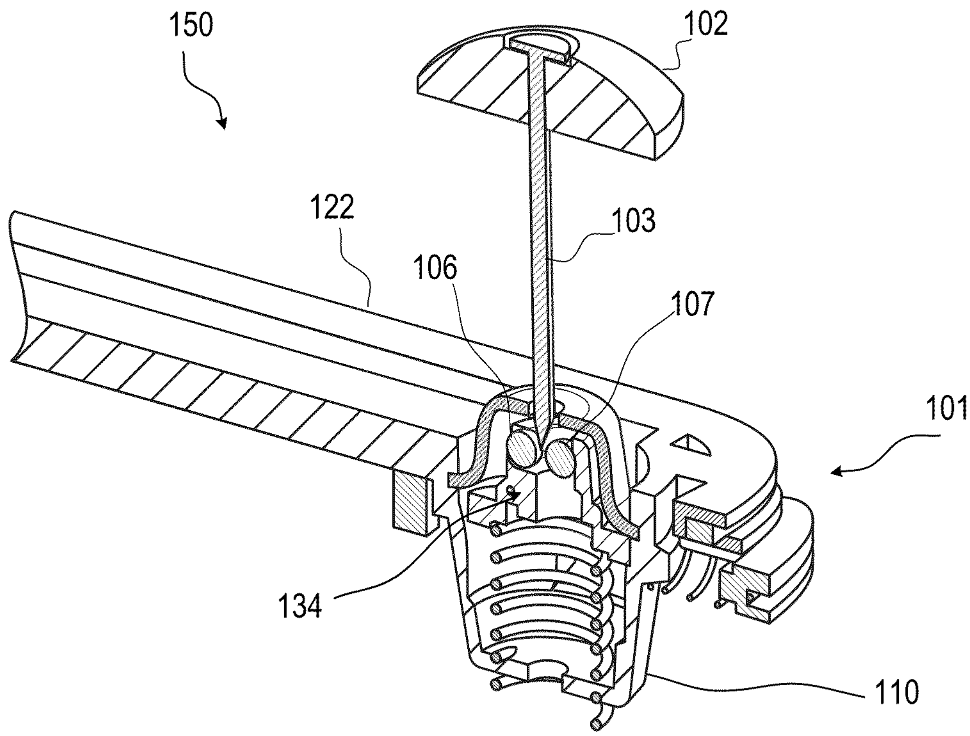
FIG. 4 is a cross-sectional view of an example of the inner body portion, locking mechanism, and connecting member of an electronic security tag in an insertion state in accordance with aspects of the present disclosure.

Referring to FIG. 4, an insertion state 150 of the electronic security tag 100 includes an initial position of the locking mechanism 101, with the plunger member 134 and balls 104, 106, and 107 biased to a top end of the bell member 129 by the clutch spring 108. In the insertion state 150, the pin portion 103 of the connecting member 102 is about to be inserted into the three balls 104, 106 and 107, and the connecting member 102 is not locked to the tag body member 122. Upon insertion of the pin portion 103 and movement along the first axis 130, the plunger member 134 and balls 104, 106, and 107 may move downward to allow the pin portion 103 to be fully inserted, and then when the insertion of the pin portion 103 is stopped, the clutch spring 108 pushes the plunger member 134 and balls 104, 106, and 107 upward into a locked state where the balls engage the pin portion (see FIG. 5).

Figure 5:
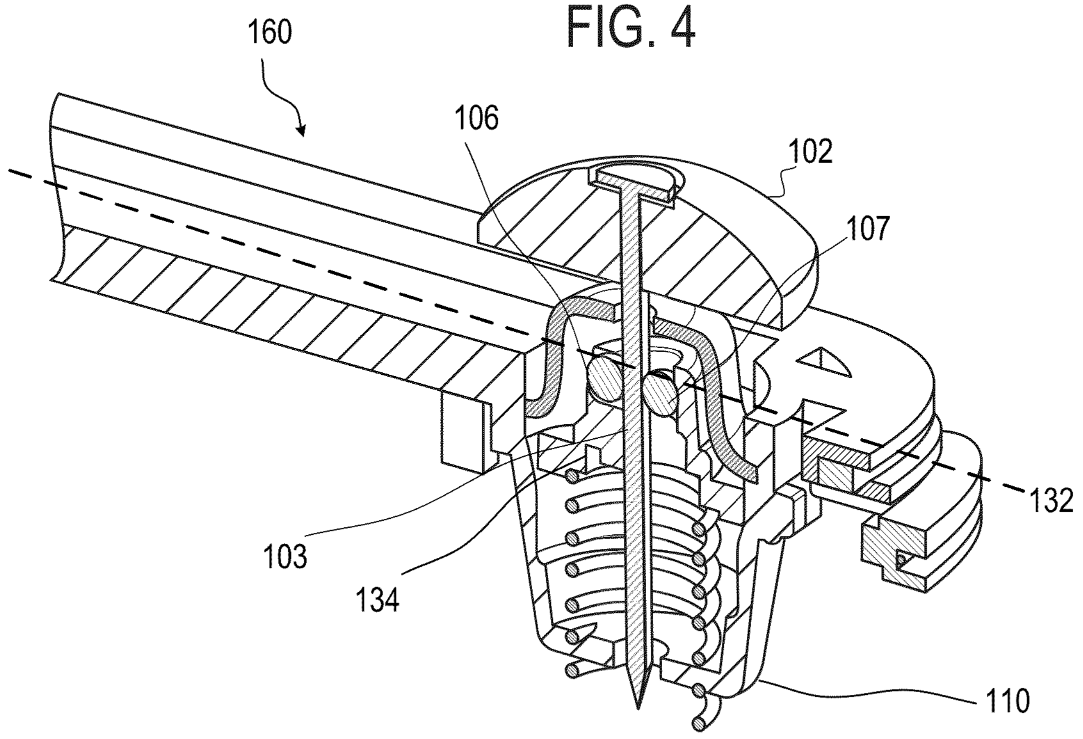
FIG. 5 is a cross-sectional view of an example of the inner body portion, locking mechanism, and connecting member of an electronic security tag in a locked state in accordance with aspects of the present disclosure.

Referring to FIG. 5, a locked state 160 of the electronic security tag 100 includes a first position of the locking mechanism 101. In the locked state 160, the pin portion 103 is locked to the tag body member 122 by the three balls 104, 106 and 107 being forced together by the biasing force applied by the clutch spring 108. From the locked state 160, the electronic security tag 100 may transition to the unlocked state 170 on application of a force to the plunger member 134, such as by movement of an unlocking mechanism, such as wedge member 110, along a second axis 132 that is perpendicular to the first axis 130.

Figure 6:
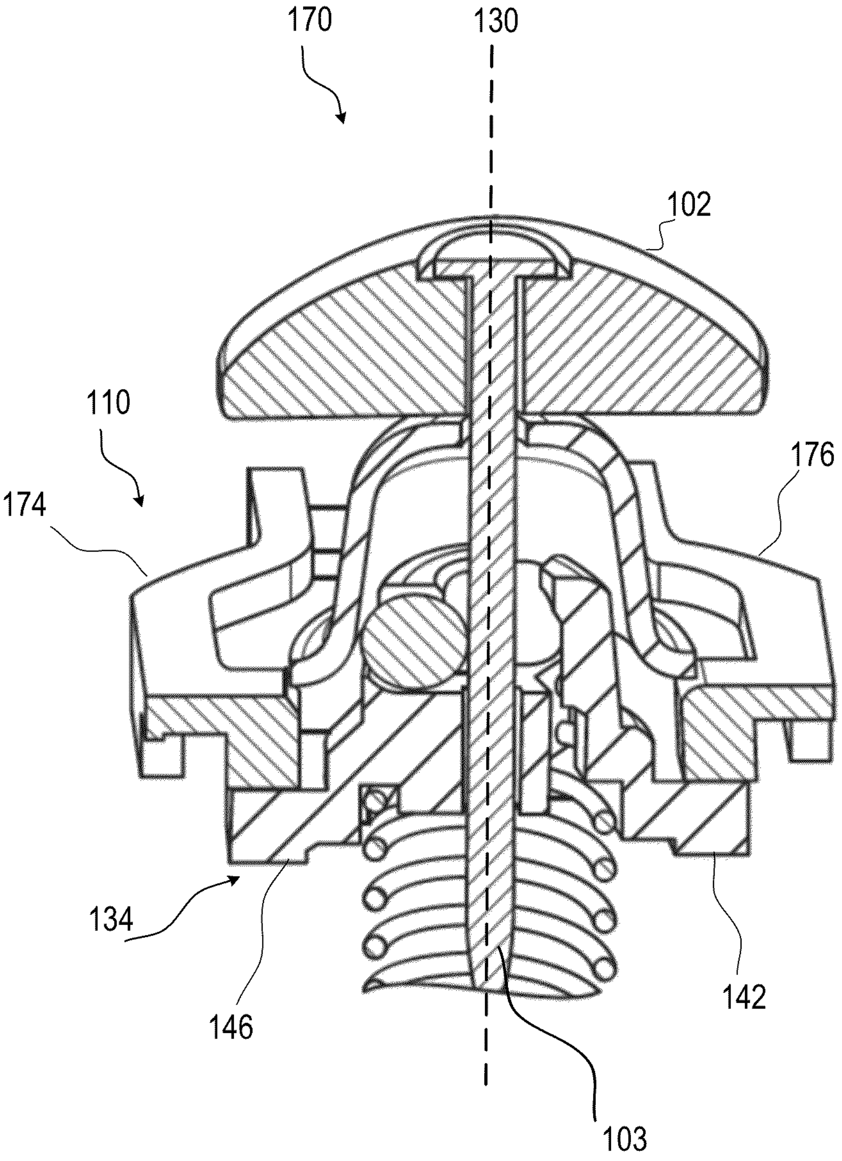
FIG. 6 is a cross-sectional view of an example of the inner body portion, locking mechanism, and connecting member of an electronic security tag in an unlocked state in accordance with aspects of the present disclosure.

Referring to FIG. 6, an unlocked state 170 of the electronic security tag 100 includes a second position of the locking mechanism 101. In particular, the plunger member 134 and balls 104, 106, and 107 are moved downward, e.g., parallel to the first axis 130, which allows the balls 104, 106, and 107 to have an increased spacing in a plane perpendicular to the first axis 130, thereby releasing the engagement of the pin portion 103. Optionally, for example in one implementation of an unlocking mechanism, the wedge member 110 is moveable along the second axis 132 (FIG. 5) perpendicular to the first axis 130 to apply an unlocking force to the plunger member 134 of the electronic security tag 100 along the first axis 130. The wedge member 110 may include a first section 174 configurable to provide biasing unlocking force to the first contact surface 146 and a second section 176 configurable to provide an unlocking force to the second contact surface 142. The wedge member 110 may be actuated by a mechanical force from an external device, a pulling or pushing force exerted by an SMA wire, or a motive force exerted by an electric motor. The application of the unlocking force by the wedge member 110 on the plunger member 134 may cause the electronic security tag 100 to transition from the locked state 160 to the unlocked state 170.

Figure 7:
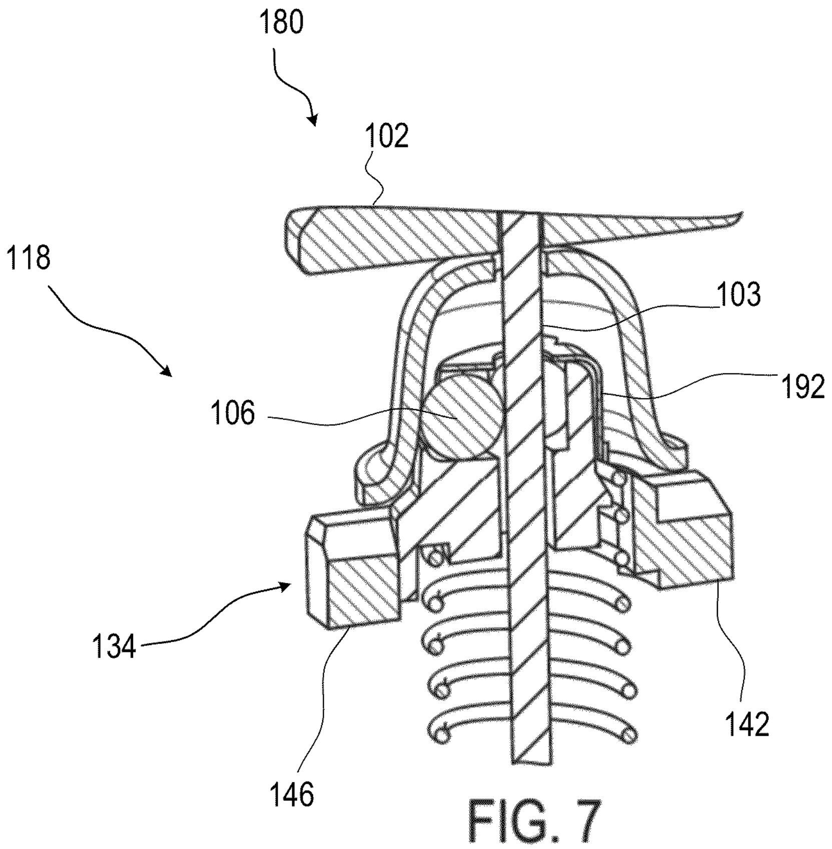
FIG. 7 is a cross-sectional view of an example of the inner body portion, locking mechanism, and connecting member of an electronic security tag including a cap for a plunger member in accordance with aspects of the present disclosure.
Figure 8:
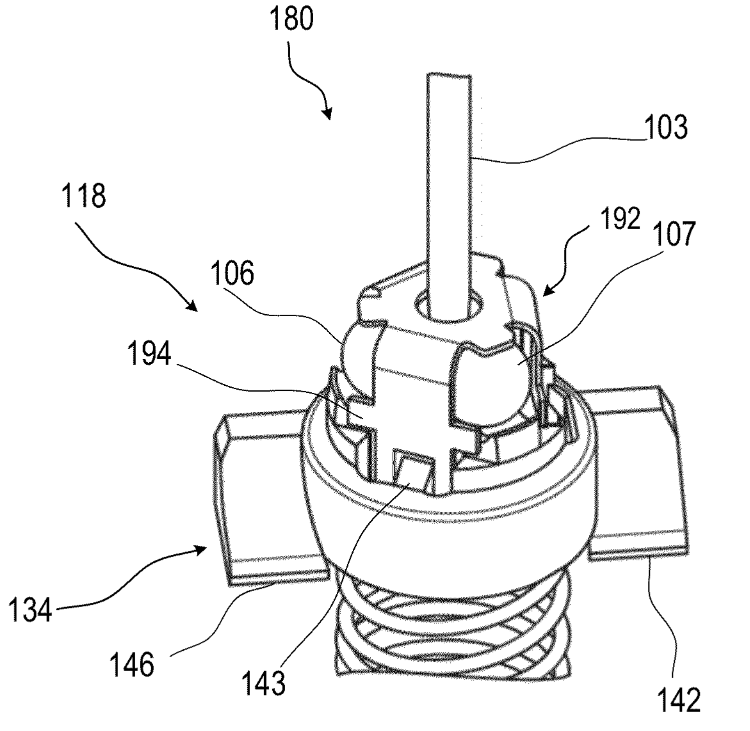
FIG. 8 is a perspective view of the example of the inner body portion, locking mechanism, and connecting member of the electronic security tag of FIG. 7, with the bell member removed.

Referring to FIGS. 7 and 8, one implementation 180 of the electronic security tag 100 includes a cap 192 connected to the plunger member 134, where the cap 192 replaces the flanges 131, 133 and 135 to retain the three balls 104, 106 and 107 of the clutch mechanism of the locking mechanism 101. For example, the cap 192 may hold the three balls 104, 106 and 107 so that they are secure in the position and not freely floating in the bell and plunger assembly 118. The cap 192 may include a tab member 194 (FIG. 8) coupled to a tang member 143 (FIG. 8) of the plunger member 134. In one implementation, the cap 192 may include three tab members coupled to corresponding three tang members of the plunger member 134. In this implementation, the balls 104, 106, and 107 are held by the cap 192 when the pin portion 103 of the connecting member 102 is locked to the tag body member 122 (i.e., the locked state).

Optionally, the tag of FIGS. 1-8 may be configured as a one piece or unitary tag where the connecting member 102 is connected to the tag body 121, such as is disclosed below in FIGS. 27-31.

Thus, referring to the aspects described above with respect to FIGS. 1-8, an example implementation includes an electronic security tag attachable to an item, comprising: a tag body member; a connecting member having a pin portion releasably engageable with the tag body member, the pin portion extending along a first axis; and a locking member to lock the connecting member to the tag body member, wherein the locking member includes a clutch mechanism movable along a second axis parallel to the first axis between a first position in contact with the pin portion and corresponding to a locked state and a second position corresponding to an unlocked state, the clutch mechanism including at least one member formed from a non-ferromagnetic material.

In addition, in the electronic security tag of the above example, the clutch mechanism comprises a plunger member formed substantially from the non-ferromagnetic material, wherein the plunger member is configured to movably hold at least three balls of the clutch mechanism, wherein the at least three balls are arranged in a circular manner to receive the pin portion of the connecting member and engage the pin portion in the locked state to resist movement away from the tag body member.

In addition, in the electronic security tag of any of the above examples, the plunger member comprises a plunger body having a flange member extending therefrom, wherein a distal end of the flange member includes an inwardly curved portion contactable with at least one of the at least three balls to move the at least one of the at least three balls along with the plunger member from the first position in contact with the pin portion to the second position corresponding to the unlocked state.

In addition, in the electronic security tag of any of the above examples, the plunger member comprises a plunger body having at least three flange members extending therefrom, wherein the at least three flange members are circumferentially spaced apart to define a corresponding at least three openings sized to receive and hold the at least three balls, wherein respective distal ends of the at least three flange member include inwardly curved portions contactable with at least one of the at least three balls to move the at least one of the at least three balls along with the plunger member from the first position in contact with the pin portion to the second position corresponding to the unlocked state.

In addition, in the electronic security tag of any of the above examples, the clutch mechanism further comprises: a bell-shaped member having a closed top end and an inner surface defining an open bottom end configured to receive the plunger member, and a biasing member in contact with the plunger member and having a biasing force that biases the plunger member toward the top end of the bell-shaped member, which corresponds to the locked state.

In addition, the electronic security tag of any of the above examples may further comprise a cap connected to a plunger body of the plunger member, wherein the cap retains the at least three balls of the clutch mechanism with the plunger member.

In addition, in the electronic security tag of any of the above examples, the cap includes a tab member, and wherein the plunger member includes a tang member coupled to the tab member.

In addition, in the electronic security tag of any of the above examples, the plunger member comprises at least one contact surface configured to receive a force to move the plunger member from the first position to the second position.

In addition, in the electronic security tag of any of the above examples, the plunger member in the second position causes the pin portion to be released from at least three balls to allow removal of the pin portion from the tag body.

In addition, in the electronic security tag of any of the above examples, the force is one of: a mechanical force on the plunger member exerted by an external device; a pulling force exerted by a shape metal alloy (SMA) wire coupled to the plunger member; or a motive force exerted by an electric motor.

In addition, in the electronic security tag of any of the above examples, the force is normal to the first axis.

In addition, the electronic security tag of any of the above examples may further comprise an unlocking member moveable along a second axis perpendicular to the first axis between a locked position and an unlocked position, wherein the unlocking member is configured to move the clutch mechanism between the first position corresponding to the locked state and the second position corresponding to the unlocked state; and an actuator connected to the unlocking member and configured to move the unlocking member from the locked position to the unlocked position.

In addition, in the electronic security tag of any of the above examples, the actuator comprises an electrical controller.

In addition, in the electronic security tag of any of the above examples, the actuator comprises a magnetic induction coil.

In addition, in the electronic security tag of any of the above examples, the actuator comprises an antenna and circuit that converts wireless signals to energy.

In addition, in the electronic security tag of any of the above examples, the actuator comprises an electric motor driving a lead screw or gear.

In addition, in the electronic security tag of any of the above examples, the tag body member and the connecting member are connected in a unitary housing.

Referring to FIGS. 9-13, an example implementation of a mechanism within an electronic tag to unlock a substantially non-magnetic locking member, such as described above with respect to FIGS. 1-6, includes an electronic tag body member 900 having an unlocking mechanism, such as an internal wedge member 902, that moves perpendicular to an axis 904 of a pin portion 906 of a connecting member 908 to cause a plunger member within a locking member 910 (similar to or the same as locking member 101 of FIG. 2) to move into an unlocked state relative to the pin member 906. The outer housings within which the tag body member 900 is mounted are not shown, but are similar to the upper and lower housing discussed above with regard to FIG. 1.

Figure 9:
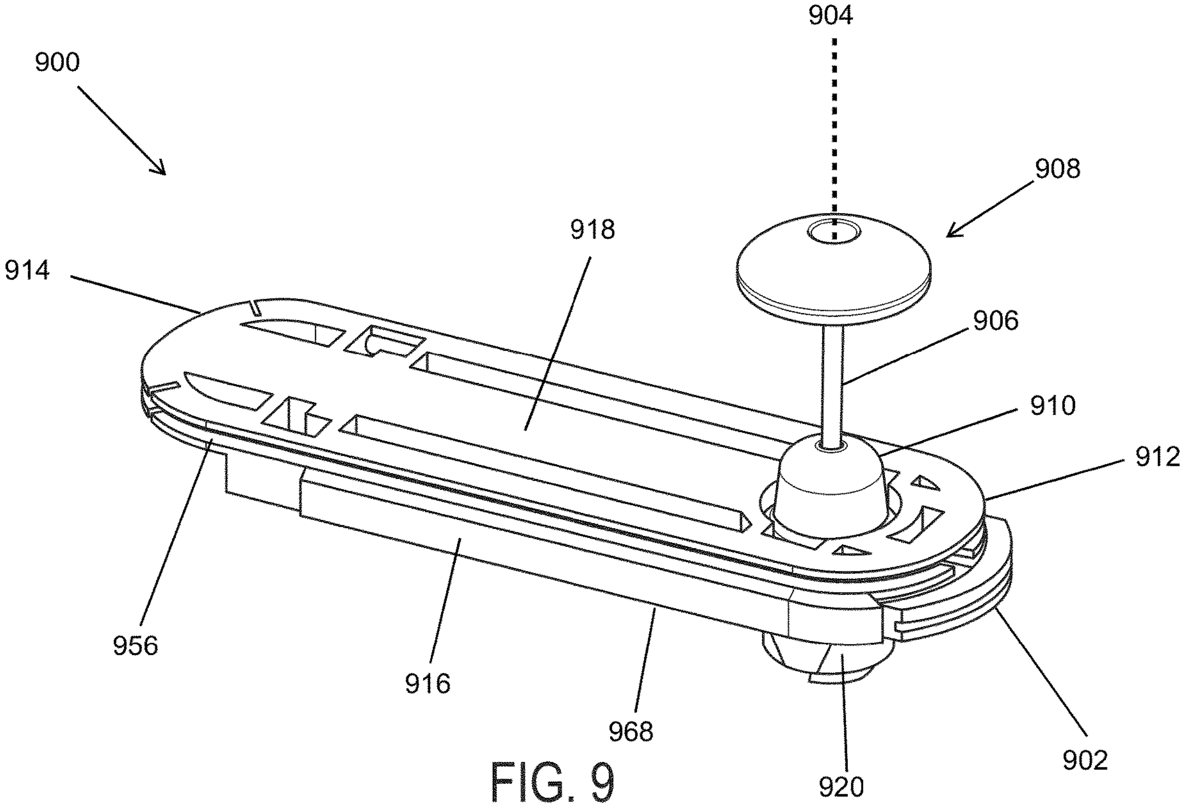
FIG. 9 is a perspective view of an example of the tag body member and locking mechanism assembly of a security tag in accordance with aspects of the present disclosure.
Figure 10:
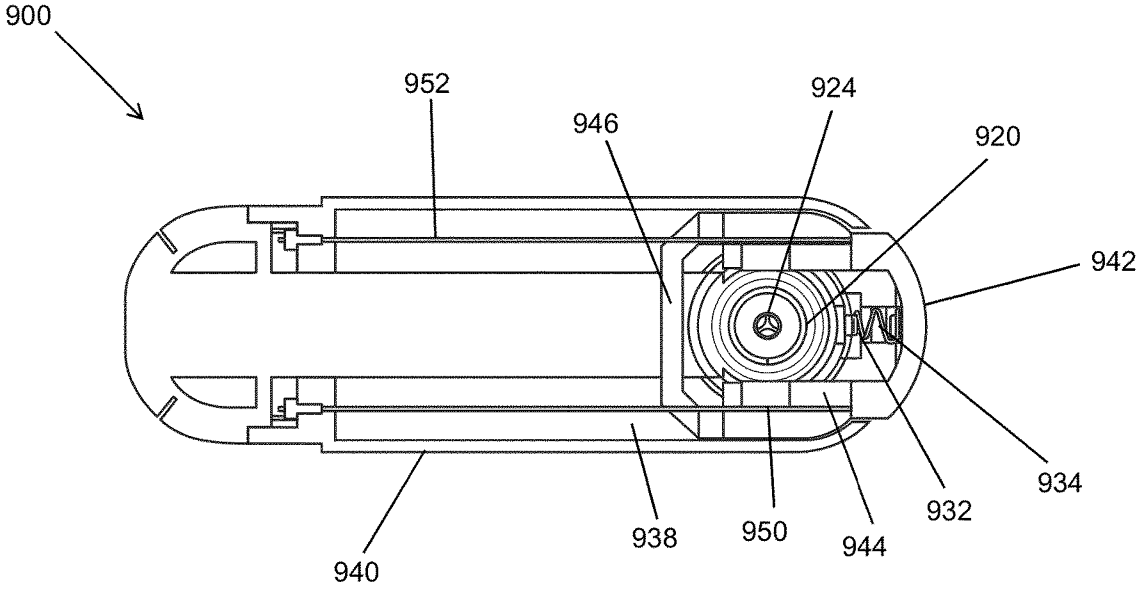
FIG. 10 is a bottom view of the security tag of FIG. 9.
Figure 11:
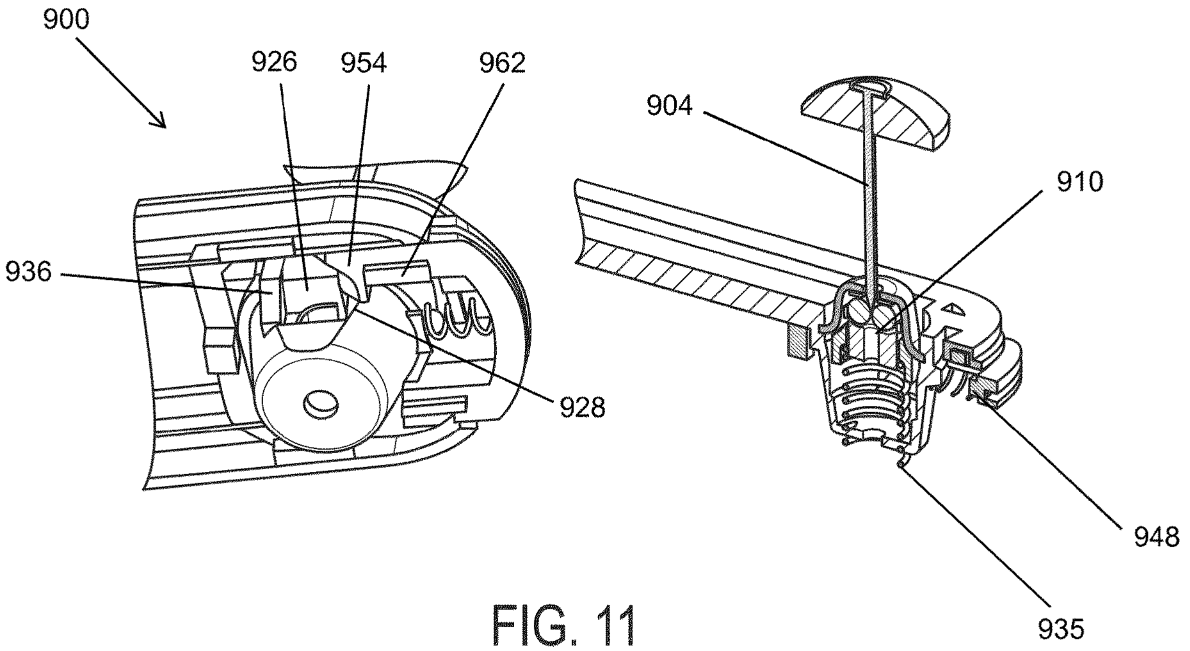
FIG. 11 is an example combined cut-away view and cross-sectional view of the EAS tag of FIG. 9 in an insertion state in accordance with aspects of the present disclosure.

Referring to FIGS. 9-11, the tag body member 900 is comprised of a first end 912 that longitudinally extends to a second end 914, thereby defining side portions 916 and a center portion 918. The center portion 918 of the tag body member 900 further comprises a well portion 920 to house the locking member 910, including the 3-ball clutch mechanism (e.g., bell and plunger assembly 118 and balls 104, 106, and 107 described in FIGS. 1-8). The well portion 920 comprises a first aperture 924 (FIG. 10) on the bottom of well portion 920 to allow the distal end of the pin member 906 to extend through the tag body member 900. The well portion 920 further comprises a second aperture 928 (FIG. 11) and an opposing third aperture (not shown) respectively configured to receive wedge portions 926 extending from opposite sides of the plunger member 910 and allow the wedge portions 926 to extend out of the well portion 920. A side of the well portion 920 further comprises a first attachment member 932 (FIG. 10) extending therefrom, defining a body around which a first end of a spring 934 may be positioned. Well wall members 936 (FIG. 11) extend from either side of the well portion 920 adjacent to the second aperture 928 and third apertures (not shown) and are configured to resist rotational movement of the wedge portions 926 when the locking member 910 is engaged by the unlocking member 902.

As can be seen in FIG. 10, as the bottom surface of the tag body member 900 include an inset surface that defines an inside portion 938 and ridges at the perimeter that define an outside portion 940. The unlocking member, such as the wedge member 902, is configured to slide on the inside portion 938 and to be contained within the outside portion 940. The ridges at the perimeter that define the outside portion 940 further comprise a gap in the first end 912 (FIG. 9) that is configured to allow an end of the unlocking member, e.g., the wedge member 902, to extend therethrough.

Still referring to FIG. 10, the wedge member 902 comprises a wedge front portion 942, two wedge side portions 944 and a wedge back portion 946. The front portion 942, side portions 944 and back portion 946 of the wedge member 902 are configured to define an internal opening to receive the well portion 920 of the tag body member 900, and to further define an outer surface that slidably fits inside the ridges at the perimeter that define the outside portion 940. The front portion 942 of the wedge member 902, which may be curved, moves through the gap in the ridges at the perimeter that define the outside portion 940 when moving between a locked and unlocked position. The inside of the wedge front portion comprises a second attachment member 948 (FIG. 11) for retaining a second end of the spring 934, which allows the wedge member 902 to be connected along a lateral axis to the well portion 920 of the tag body 900. In one implementation, the side portions 944 of the wedge member 902 contain grooves 950 (also see FIG. 12) which are configured to receive a shape memory alloy (SMA) wire 952. Further, in this example, the ends of the SMA wire 952 are attached to the second end 914 (FIG. 9) of the tag body member 900, and the SMA wire 952 extends along the side portions 916 (FIG. 9), through the grooves 950 of the wedge member 902 and wraps around the front portion 942 of the wedge member 902. This allows the SMA wire 952 to pull the wedge member 902 in a direction perpendicular to and toward the pin portion 906 to move the plunger member into the unlocked position as shown in FIG. 13.

The SMA wire 952 along with the spring 934 guides the wedge member 902 along an axis perpendicular to the axis 904 (FIG. 9) of the pin portion 906, between a locked first position (FIG. 12), where the pin is held in place, to an unlocked second position (FIG. 13), where the pin can move freely.

Figure 12:
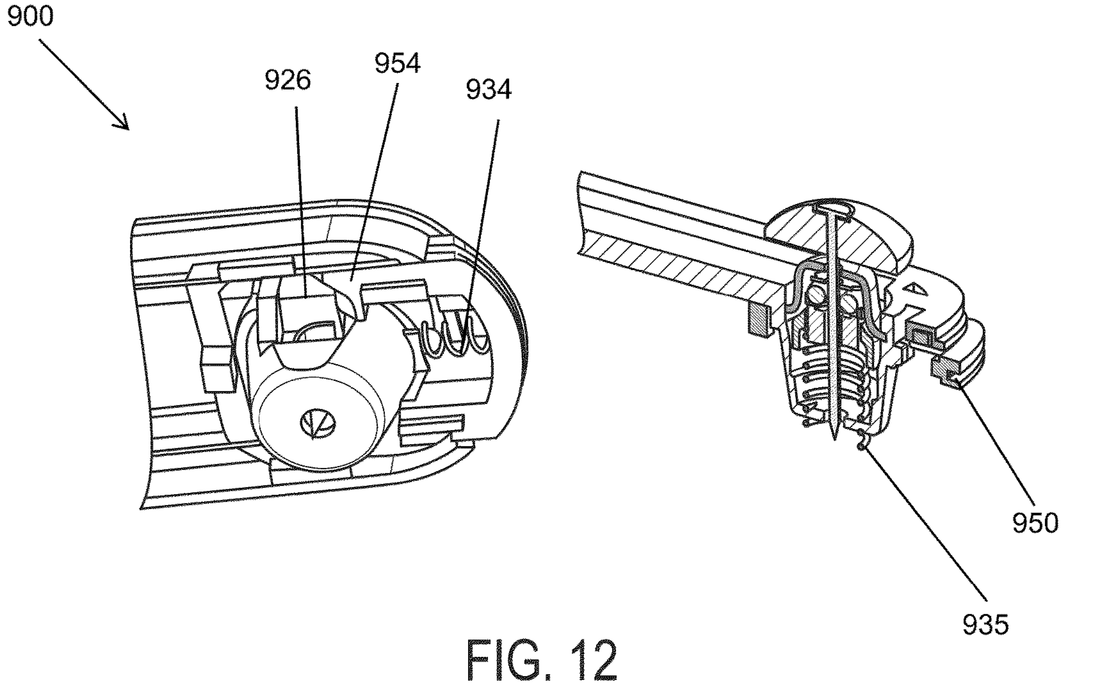
FIG. 12 is an example combined cut-away view and cross-sectional view of the EAS tag of FIG. 9 in a locked state in accordance with aspects of the present disclosure.
Figure 13:
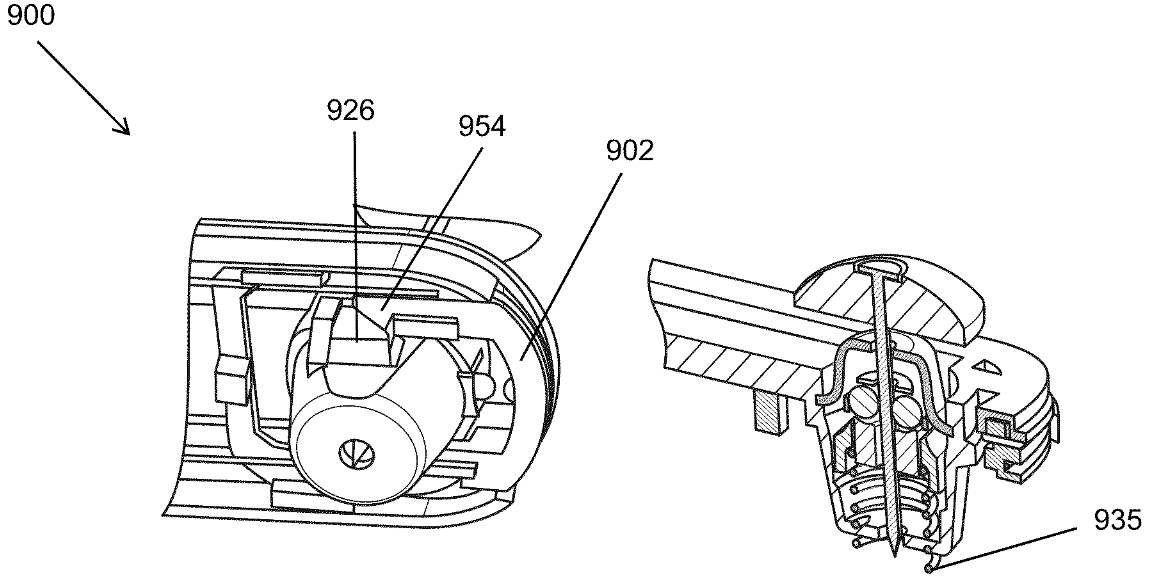
FIG. 13 is an example combined cut-away view and cross-sectional view of the EAS tag of FIG. 9 in an unlocked state in accordance with aspects of the present disclosure.

Referring to FIGS. 11-13, the wedge member 902 further comprise wedge portions 954 extending therefrom and configured to oppose the wedge portions 926 of the plunger member. The SMA wire 952 is configured to move wedge member 902 from the first position to the second position as described above where the wedge portions 954 of the wedge member 902 engage the wedge portions 926 of the plunger member 910 causing the plunger member to move downward into the well portion 920, thereby releasing the pin as described above in FIGS. 1-8.

In other words, the wedge portions 926 of the plunger member move away from the top of the tag body in response to the wedge portions 954 of the wedge member 902 moving toward and perpendicularly with respect to the axis 904 of the pin member 906, thereby causing the plunger member to pull down the balls and release the 3 ball clutch, allowing detachment of the pin member 906 from the tag body 900, as shown in FIG. 13. The wedge member 902 moves perpendicular to axis 904 of the pin member 906 based on contraction of the SMA wire 952, in response to an electrical signal from, for example, the electrical controller 125 (FIG. 1) discussed above, thereby causing the wedge portions 954 of the wedge member 902 to engage the wedge portions 926 of the plunger member. The well wall members 936 engage the back of the wedge portions 926, guiding them to move in a direction parallel to the axis 904 of the pin member 906. This causes the plunger member to move parallel to the axis 904 of the pin member 906, which disengages the locking member 910, e.g., the 3-ball clutch mechanism as described in FIGS. 1-8, and allows the pin member 906 to be released or detached.

After the SMA wire 952 releases the wedge member 902, the combined forces of the spring 934 and spring 935, located between the plunger member and the well portion 920, cause the wedge portions 926, 954 to push opposite each other to move the wedge member 902 back to the locked position or the insertion position.

In some implementations, referring back to FIGS. 9 and 10, the outside portion 940 (FIG. 10) of the tag body member 900 comprises a second groove 956 which runs along the entire outside of the tag body member 900. The second groove 956 may be sized to house a copper wire coil, which is designed to form an inductive loop, which may be magnetically energized to generate an electrical signal that can be conducted through the SMA wire 952, heating the SMA wire 952 so that it contracts to move the wedge member 902 to the unlocked position as shown in FIG. 13. When the electrical signal is no longer applied, the SMA wire 952 cools off, thereby expanding to release the wedge member 902. In one implementation, the wedge member 902 is pushed back into the locked position by the spring 934 providing a spring force toward the outside of the tag body 900 and perpendicular to the axis 904 of the pin member 906. In an alternative or additional implementation, the spring 935 within the well portion 920 that is compressed upon contraction of the SMA wire 952 provides a spring force toward a top of the tag body 900 and parallel to the axis 904 of the pin member 906, thereby causing the wedge portions 926 of the plunger member to transfer force to the wedge portions 954 of the wedge member 902, moving the wedge member 902 back to the locked position.

It should be noted that the above discussion utilizes the example of the electrical controller 125 generating a signal to actuate the SMA wire 952, and it should be understood that such signal may be generated based on inductive coupling and/or wirelessly transmitted energy (non-magnetic coupling) such as WiFi or RFID radiation paired with energy harvesting circuitry to charge a battery or capacitor that resides in the tag, or based on energy from a battery that resides on the tag, or any other source of energy that may power electrical controller 125 or that may be harvested by the energy pickup component 112 (FIG. 1).

Figure 14:
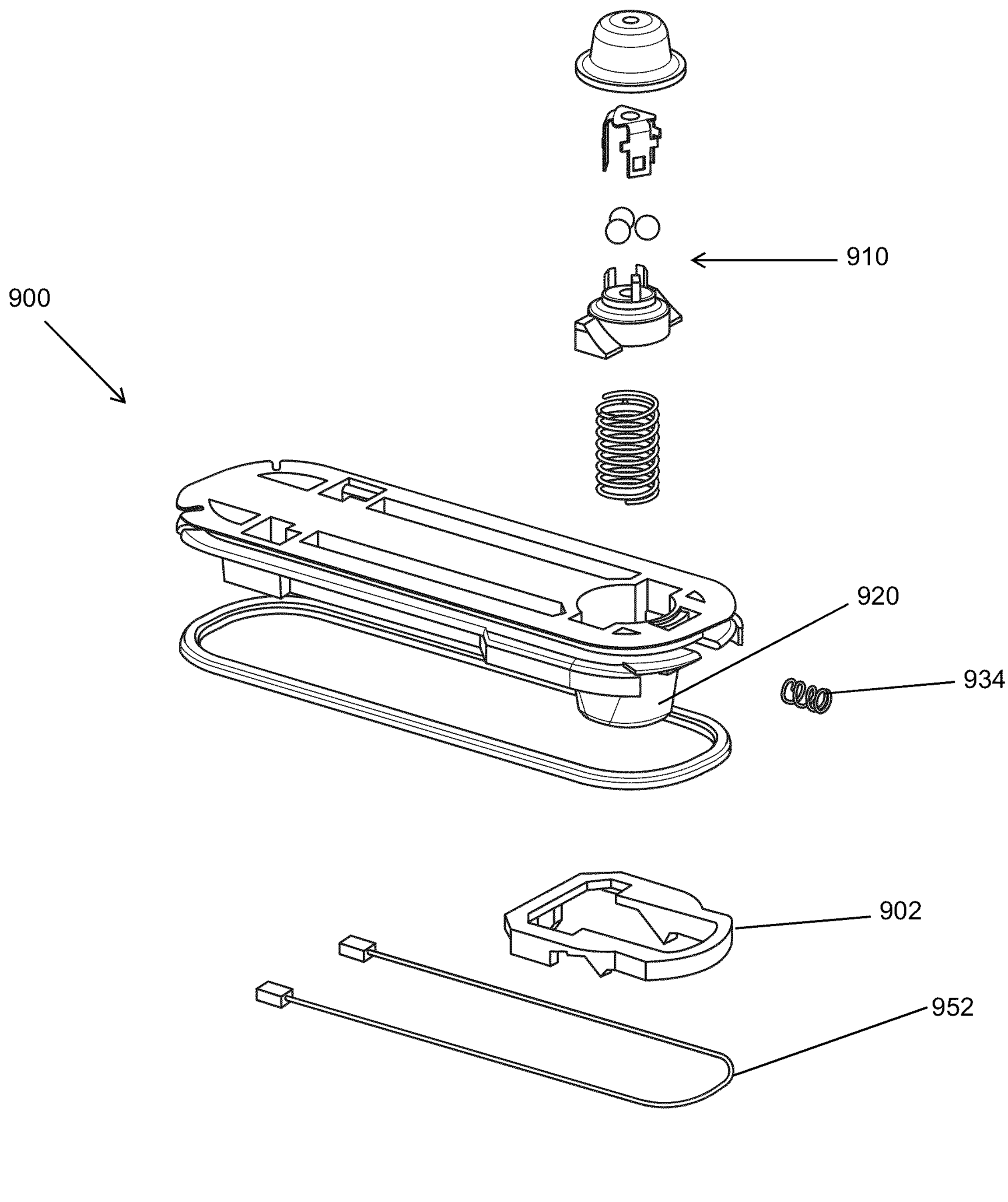
FIG. 14 is an exploded view of an example EAS tag similar to FIG. 9, but with another example of a ball and plunger assembly in accordance with aspects of the present disclosure.

Referring to FIG. 14, another example implementation of a mechanism within an electronic tag to unlock a substantially non-magnetic locking member includes an electronic tag body member 900 having an unlocking mechanism 910, which may operate and be configured the same as described above with respect to FIG. 9-13, but in this case with the plunger member including a cap instead of flanges, such as described above with respect to FIGS. 7 and 8.

Thus, referring to the aspects described above with respect to FIGS. 9-14, an example implementation includes an electronic article surveillance tag, comprising: a tag body member; a connecting member having a pin portion releasably engageable with the tag body member, the pin portion extending along a first axis; a locking member attached to the tag body member and configured to receive the pin portion to lock the connecting member to the tag body member, wherein the locking member includes a clutch mechanism movable parallel to the first axis between a first position in fixed engagement with the pin portion and corresponding to a locked state and a second position corresponding to an unlocked state that allows detachment of the pin portion from the locking member, the clutch mechanism including a plunger member formed from a non-ferromagnetic material and having a first contact surface; an unlocking member slidably engaged with the tag body member and moveable along a second axis perpendicular to the first axis between a locked position and an unlocked position, wherein the unlocking member includes a second contact surface that contacts the first contact surface during movement between the locked position and the unlocked position to move the clutch mechanism between the first position corresponding to the locked state and the second position corresponding to the unlocked state; and an actuator connected to the unlocking member and configured to move the unlocking member from the locked position to the unlocked position.

In addition, in the electronic security tag of the above example, the unlocking member includes a wedge member, wherein the second contact surface comprises an angled surface relative to the first axis.

In addition, in the electronic security tag of any of the above examples, the first contact surface of the plunger member comprises an angled surface relative to the first axis.

In addition, the electronic security tag of any of the above examples may further comprise an electrical circuit configured to energize the actuator to move the unlocking member from the locked position to the unlocked position.

In addition, in the electronic security tag of any of the above examples, the electrical circuit includes an electromagnetic receiver coil configured to inductively couple with a charging inductive coil, an antenna to receive wireless signals and store the associated energy in an energy storage device, or a battery.

In addition, in the electronic security tag of any of the above examples, the actuator comprises a shape memory alloy wire having a first length in a first state corresponding to the locked position of the unlocking member and having a second length in second state corresponding to the unlocked position of the unlocking member, wherein the first length is greater than the second length.

In addition, in the electronic security tag of any of the above examples, the shape member alloy wire includes a first end and a second end attached to the tag body member and a middle section connected to the unlocking member.

In addition, the electronic security tag of any of the above examples may further comprise a spring member between the actuator and the tag body member to bias the actuator to move the unlocking member to the locked position.

In addition, in the electronic security tag of any of the above examples, the tag body member includes a well portion defining a cavity, wherein the clutch mechanism is movable within the cavity, and further comprising a spring member between the clutch mechanism and the well portion to bias the clutch mechanism to move to the first position corresponding to the locked state.

In addition, in the electronic security tag of any of the above examples, the actuator comprises an electrical controller.

In addition, in the electronic security tag of any of the above examples, the actuator may comprise an induction coil.

In addition, in the electronic security tag of any of the above examples, the actuator may comprise an antenna and circuit that converts wireless signals to energy.

In addition, in the electronic security tag of any of the above examples, the actuator may comprise an electric motor driving a lead screw or gear.

In addition, in the electronic security tag of any of the above examples, the tag body member and the connecting member are connected in a unitary housing.

Figure 15:
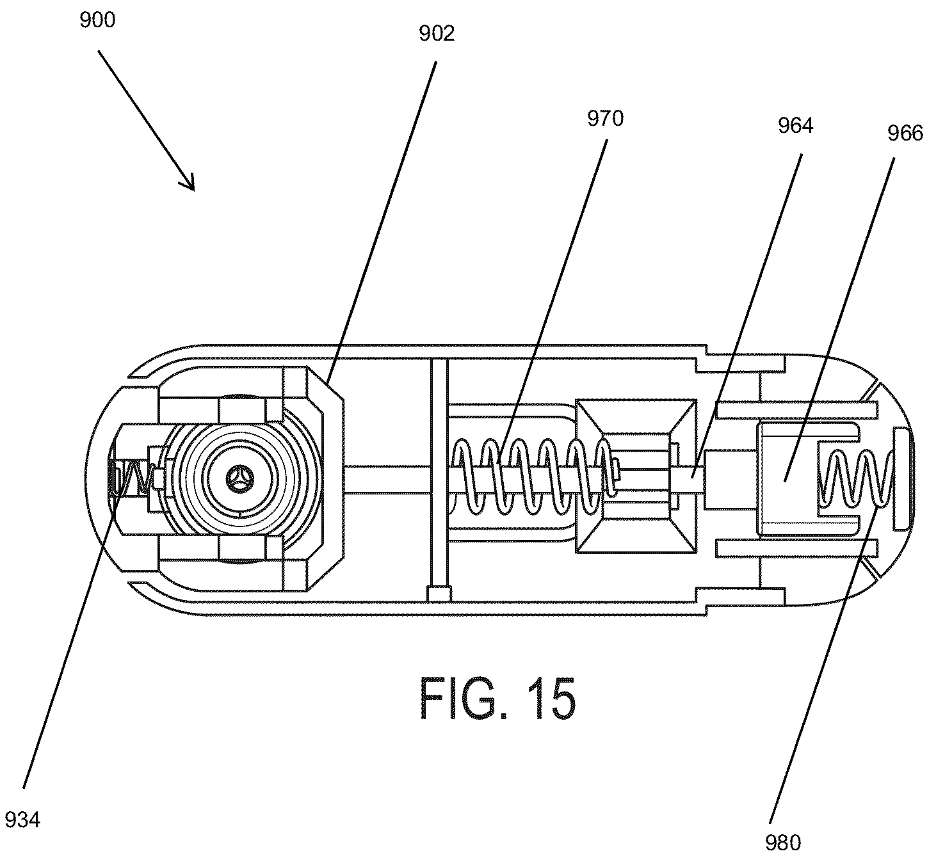
FIG. 15 is a bottom view of another example EAS tag having a latch formed from a magnetic material, in accordance with aspects of the present disclosure.

Referring to FIG. 15, another aspect of providing lateral detachment includes the lateral movement of the wedge member 902 being provided by a rod 964, which is connected at one end to the wedge member 902. The opposite end of the rod 964 has a body 966 formed from a ferrous material that can be "pulled" by a magnetic tag detacher that is placed at an end of the tag body member 900 adjacent to the body 966. The wedge member 902 moves perpendicular to the axis 904 (FIG. 9) of the pin member 906 based on the pulling force of the rod 964 and the body 966, in response to a magnetic force from, for example, a magnetic tag detacher, thereby causing the wedge portions 954 of the wedge member 902 to engage the wedge portions 926 of the plunger member. This causes the plunger member to move parallel to the axis 904 of the pin member 906, which disengages the 3-ball clutch mechanism as described in FIGS. 1-8, and allows the pin member 906 to be released or detached. The wedge member 902 is returned to the engaged position from the force of the spring 934 and/or spring 970 and/or spring 980, which pushes the wedge member 902 back to the initial locked position. This does not follow traditional 3-ball clutch architecture in that the tag orientation would be perpendicular all current designs. Additionally, the non-magnetic aspects of the discussed 3-ball clutch is maintained for other benefits aside from the detachment actuator (i.e., ferromagnetic wedge in this figure).

Thus, referring to the aspects described above with respect to FIG. 15, an example implementation includes an electronic article surveillance tag, comprising: a tag body member; a connecting member having a pin portion releasably engageable with the tag body member, wherein the pin portion extends along a first axis; a locking member attached to the tag body member and configured to receive the pin portion to lock the connecting member to the tag body member, wherein the locking member includes a clutch mechanism movable parallel to the first axis between a first position in fixed engagement with the pin portion and corresponding to a locked state and a second position corresponding to an unlocked state that allows detachment of the pin portion from the locking member, the clutch mechanism including a plunger member formed from a non-ferromagnetic material; and an unlocking member attached to the tag body member and moveable along a second axis perpendicular to the first axis between a locked position and an unlocked position, wherein during movement between the locked position and the unlocked position, the unlocking member moves the clutch mechanism between the first position corresponding to the locked state and the second position corresponding to the unlocked state.

In addition, in the electronic article surveillance tag of the above example, the unlocking member includes an unlocking body formed from a ferromagnetic material configured to move the unlocking member from the locked position to the unlocked position in response to a magnetic field.

In addition, in the electronic article surveillance tag of any of the above examples, the unlocking body is located adjacent to a first end of the tag body member and the locking member is located adjacent to a second end of the tag body member that is opposite to the first end.

In addition, in the electronic article surveillance tag of any of the above examples, the unlocking member includes a rod that connects the unlocking body to the locking member.

In addition, in the electronic article surveillance tag of any of the above examples, the unlocking member includes a spring that biases the unlocking member toward the locked position.

In addition, in the electronic article surveillance tag of any of the above examples, the plunger member includes a first contact surface, wherein the unlocking member includes a second contact surface that slidably engages the first contact surface, and wherein the second contact surface comprises an angled surface relative to the first axis.

In addition, in the electronic article surveillance tag of any of the above examples, the first contact surface of the plunger member comprises an angled surface relative to the first axis.

In addition, in the electronic article surveillance tag of any of the above examples, the plunger member includes a first contact surface, wherein the unlocking member includes a second contact surface that slidably engages the first contact surface, and wherein the first contact surface comprises an angled surface relative to the first axis.

In addition, the electronic article surveillance tag of any of the above examples may further comprise a detacher mechanism configured to receive an end of the electronic article surveillance tag, wherein the detacher mechanism comprises a magnet having the magnetic field.

In addition, in the electronic article surveillance tag of any of the above examples, the tag body member includes a well portion defining a cavity, wherein the clutch mechanism is movable within the cavity, and further comprising a spring member between the clutch mechanism and the well portion to bias the clutch mechanism to move to the first position corresponding to the locked state.

In addition, in the electronic article surveillance tag of any of the above examples, the unlocking member includes an actuator.

In addition, in the electronic article surveillance tag of any of the above examples, the actuator comprises an electrical controller.

In addition, in the electronic article surveillance tag of any of the above examples, wherein the actuator comprises a magnetic induction coil.

In addition, in the electronic article surveillance tag of any of the above examples, the actuator comprises an antenna and circuit that converts wireless signals to energy.

In addition, in the electronic article surveillance tag of any of the above examples, the actuator comprises an electric motor driving a lead screw or gear.

In addition, in the electronic article surveillance tag of any of the above examples, the tag body member and the connecting member are connected in a unitary housing.

Referring to FIGS. 16-26, another example implementation of a mechanism within an electronic tag to unlock a substantially non-magnetic locking member, such as described above with respect to FIGS. 1-8, includes an electronic tag having a rotational drive member that is rotatable about an axis of a pin portion of a connecting member to cause a plunger member to move into an unlocked state relative to the pin portion. In particular, another example EAS tag locking mechanism 1500, which is contained within an EAS tag, not shown, may comprise a connecting member 1501 defined by a tack with an embedded pin portion 1502. The connecting member 1501 may be configured to interoperate with a plurality of steel balls 1506, wherein the steel balls 1506 may be held by a plunger mechanism 1510 housed within a bell member 1504 (hereinafter interchangeably referred to as a "clutch mechanism"). In one example, the EAS tag locking mechanism 1500 may include three steel balls 1506, wherein the three steel balls 1506 may interoperate with the pin portion 1502 via three different points of contact.

The EAS tag locking mechanism 1500 may further include a rotational drive member 1508 (also referred to as a "rotating cam") configured to interoperate with the plunger member 1510 to move the plunger member 1510, and more generally the clutch mechanism, from the locked state to the unlocked state as described herein. The plunger member 1510, may include a plurality of capture recesses 1512 configured to capture, secure, or otherwise contain the steel balls 1506 when the clutch mechanism is moved from a locked position to an unlocked position. The rotational drive member 1508 includes an inner surface having a plurality of protrusions 1514, wherein protrusions 1514 may be substantially shaped as ramp members. The protrusions 1514 of the rotational drive member 1508 may further be configured to engageably interoperate with a second plurality of protrusions 1516 extending from an outer surface of the body of the plunger mechanism 1510. The protrusions 1516 may also be configured to be substantially shaped as ramp members. In one example, the EAS tag locking mechanism 1500 may be configured to include five of protrusions 1514 and five of protrusions 1516, such that there exists five points of contact between the plunger mechanism 1510 and the rotational drive member 1508 to distribute the force applied by the rotational drive member 1508 to the plunger member 1510. The five points of contact may stabilize the movement between the rotational drive member 1508 and the plunger mechanism 1510 during operation movement between the locked and unlocked states. The EAS tag locking mechanism 1500 may further include a spring member 1518 that contacts the plunger member 1510 and applies a biasing force to move the plunger member 1510 and hence the clutch mechanism toward the locked state.

Figure 16:
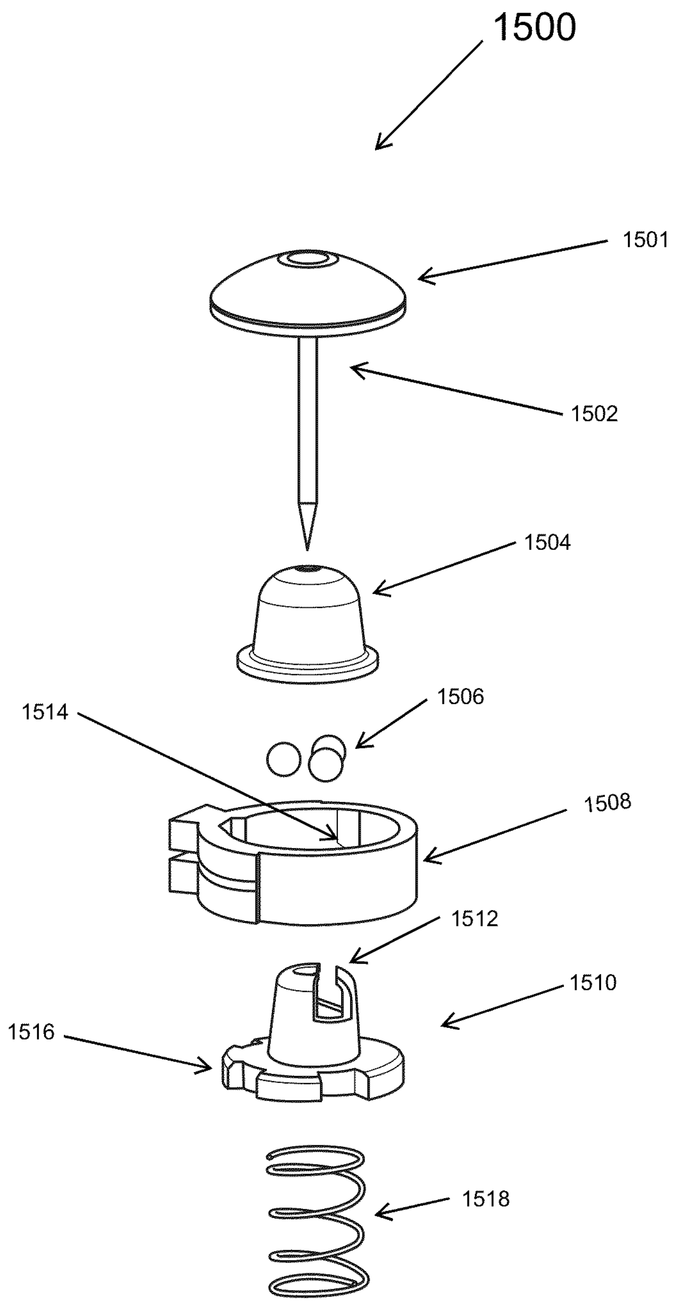
FIG. 16 is an exploded view of an example of a portion of a rotating locking mechanism of an EAS tag in accordance with aspects of the present disclosure.
Figure 17:
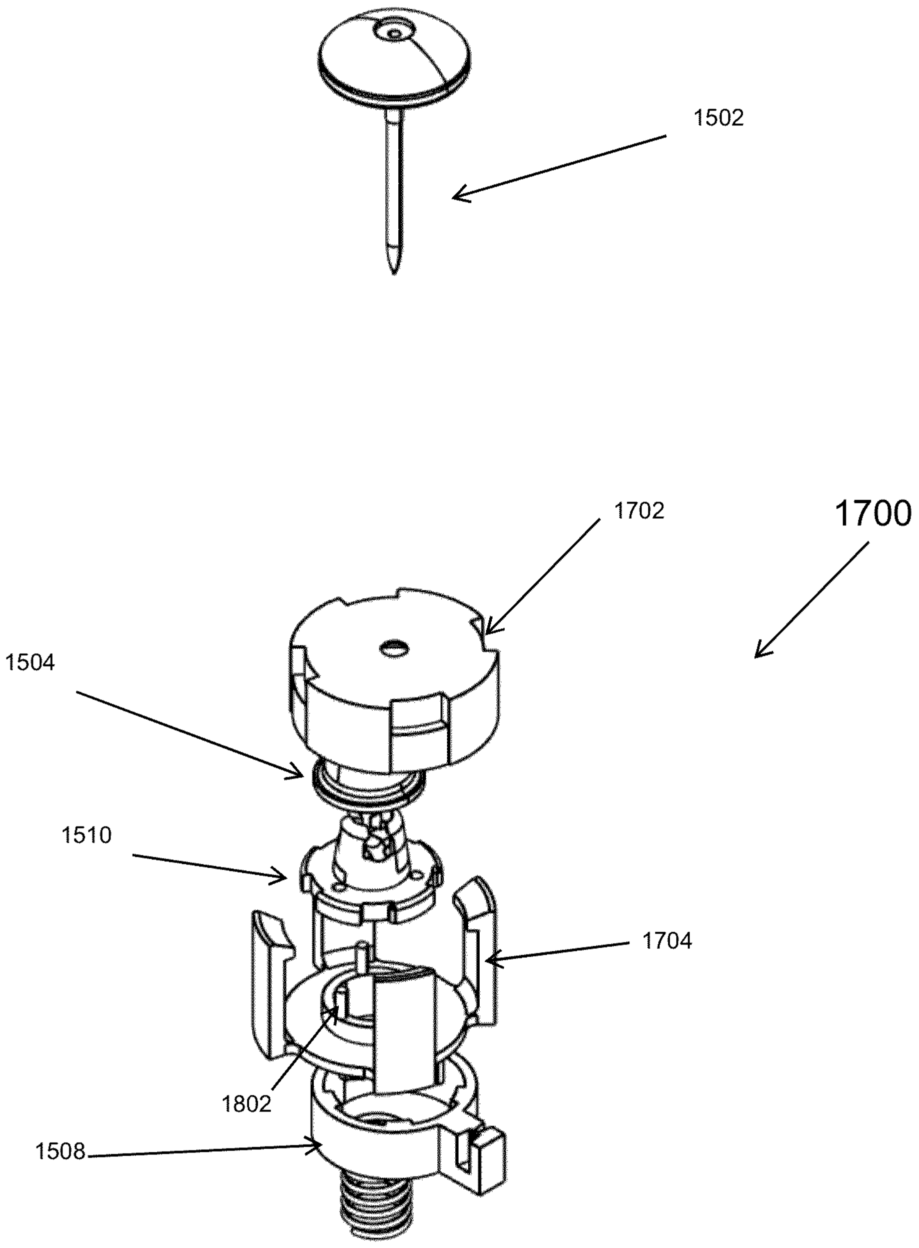
FIG. 17 is an exploded view of an example of additional components of the rotating locking mechanism of FIG. 16.
Figure 18:
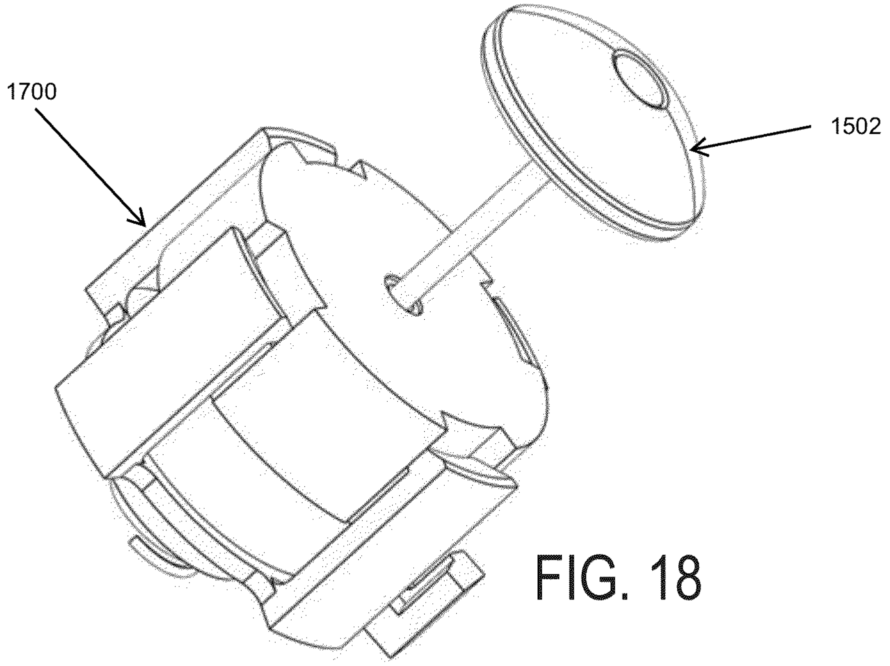
FIG. 18 is a top perspective view of the rotating locking mechanism of FIG. 17.
Figure 19:
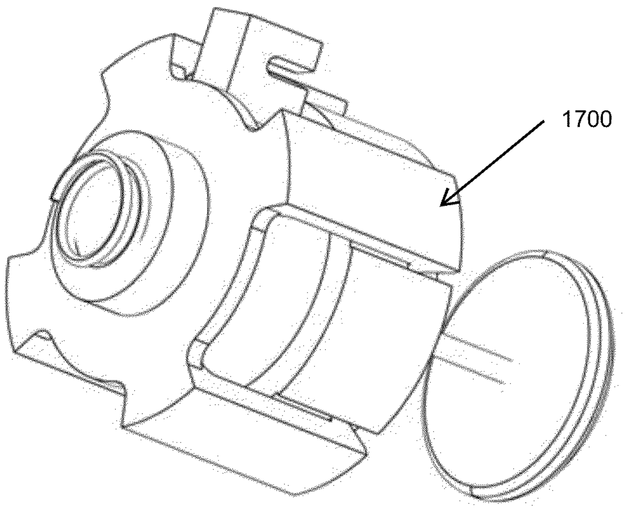
FIG. 19 is a bottom perspective view of the rotating locking mechanism of FIG. 17.

Referring to FIGS. 17-19, EAS tag locking mechanism 1500 further includes a housing member 1700, including a top housing 1702 and a bottom housing 1704 within which the rotational drive member 1508 and the clutch mechanism (plunger member 1510, bell 1504, connecting member 1502, and balls 1506) may be rotationally mounted. For example, the housing members 1702 and 1704 define a top housing having grooves and notches to which flange members extending from the bottom housing can be releasably affixed to stabilize the EAS tag locking mechanism 1500, as described in FIGS. 15-16, during the process of applying a rotational force to rotational drive member 1508 during the unlocking and locking processes.

Figure 20:
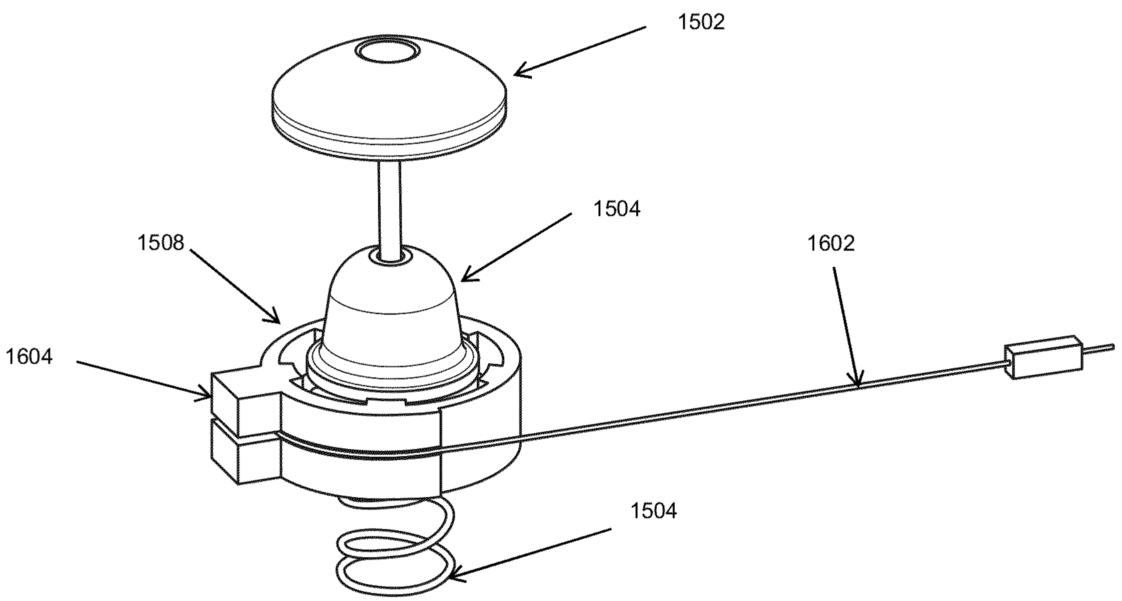
FIG. 20 is a perspective view of an example of a shape memory alloy (SMA) actuator for use with the rotating locking mechanism of FIG. 16.
Figure 21:
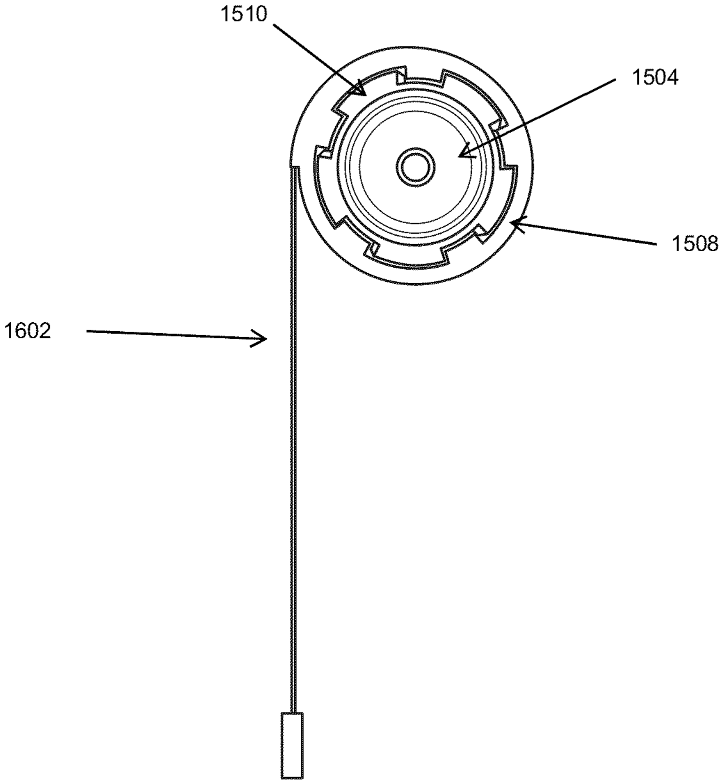
FIG. 21 is a top view of the actuator and locking mechanism of FIG. 20.

Referring to FIGS. 20 and 21, an example implementation of an assembled rotational drive member 1508 and clutch mechanism include the rotational drive member 1508 interoperating with an actuator device, such as but not limited to an SMA wire 1602. The SMA wire 1602 may be fixably attached to a flange 1604, wherein flange 1604 may extend from a body of rotational drive member 1508. The SMA wire 1602 may be formed from an alloy that displays two distinct crystal structures and or phases depending on temperature and internal stresses. At lower temperatures, the alloy may be easily deformed into any shape; however, when the alloy is heated, it may return to the shape it had before it was deformed. In this example, the SMA wire 1602 may receive an electrical signal from the electrical controller 125 (discussed above in FIG. 1). Consequently, the EAS tag locking mechanism 1500 may be switched from a locked to an unlocked position via a rotational force applied by SMA wire 1602 to the rotational drive member 1508, such as when the SMA wire 1602 is deformed upon reaching a transition temperature via the application of a current. In one example, upon an application of a current, the SMA wire 1602 may shrink, such that the shrinking SMA wire 1602 may apply a rotational force to the rotational drive member 1508. Further, the rotation of the rotational drive member 1508 may, via the interoperation of the protrusions 1514 and 1516, push the plunger member 1510 holding the balls 1506 in a direction substantially perpendicular to a plane of the rotational motion, and in a direction opposite the position of the connecting member 1502 and the bell 1504. The motion of the plunger member 1510 may then result in the balls 1506 moving down within the bell 1504, due to the capture recesses 1512 causing the balls 1506 to move with the plunger member 1510, such that the pin portion 1502 may be removed. Consequently, applying a current to SMA wire 1602 may result in removal of the pin portion 1502 and the unlocking of the EAS tag locking mechanism 1500.

Though the rotational drive member 1508 may be rotated by the application of a current to the SMA wire 1602, according to various aspects of the present disclosure, the rotational force may be effected by any suitable mechanical, electrical, magnetic, electro-mechanical, and/or magneto-mechanical arrangement, such as a micro-motor, a potential energy storage device that harvests the kinetic energy of, for example, pushing the tack pin, such as the connecting member 1501 downward into the three balls and clutch housing member, or a moving and/or rotating magnetic field, and/or any aspects relating to the electrical controller 125 and/or energy pickup component 112 discussed above with respect to FIG. 1.

Upon removal of the current from the SMA wire 1602, the EAS tag locking mechanism 1500 may return to its initial locked state. The locking of the EAS tag locking mechanism 1500 may be induced by the return of the SMA wire to its pre-deformed shape, such that the rotational drive member 1508 is rotated in the opposite direction in comparison to the initial rotation, back to its initial position. In combination with the rotation of the rotational drive member 1508, the spring member 1518, which was compressed in the unlocking of EAS tag locking mechanism 1500, may apply an upward vertical force substantially perpendicular to the plane of rotation of the rotation drive member 1508, in order to assist the upward movement of the plunger member 1510 and the balls 1506 within the bell 1504, e.g., back into their locked positions.

Figure 22:
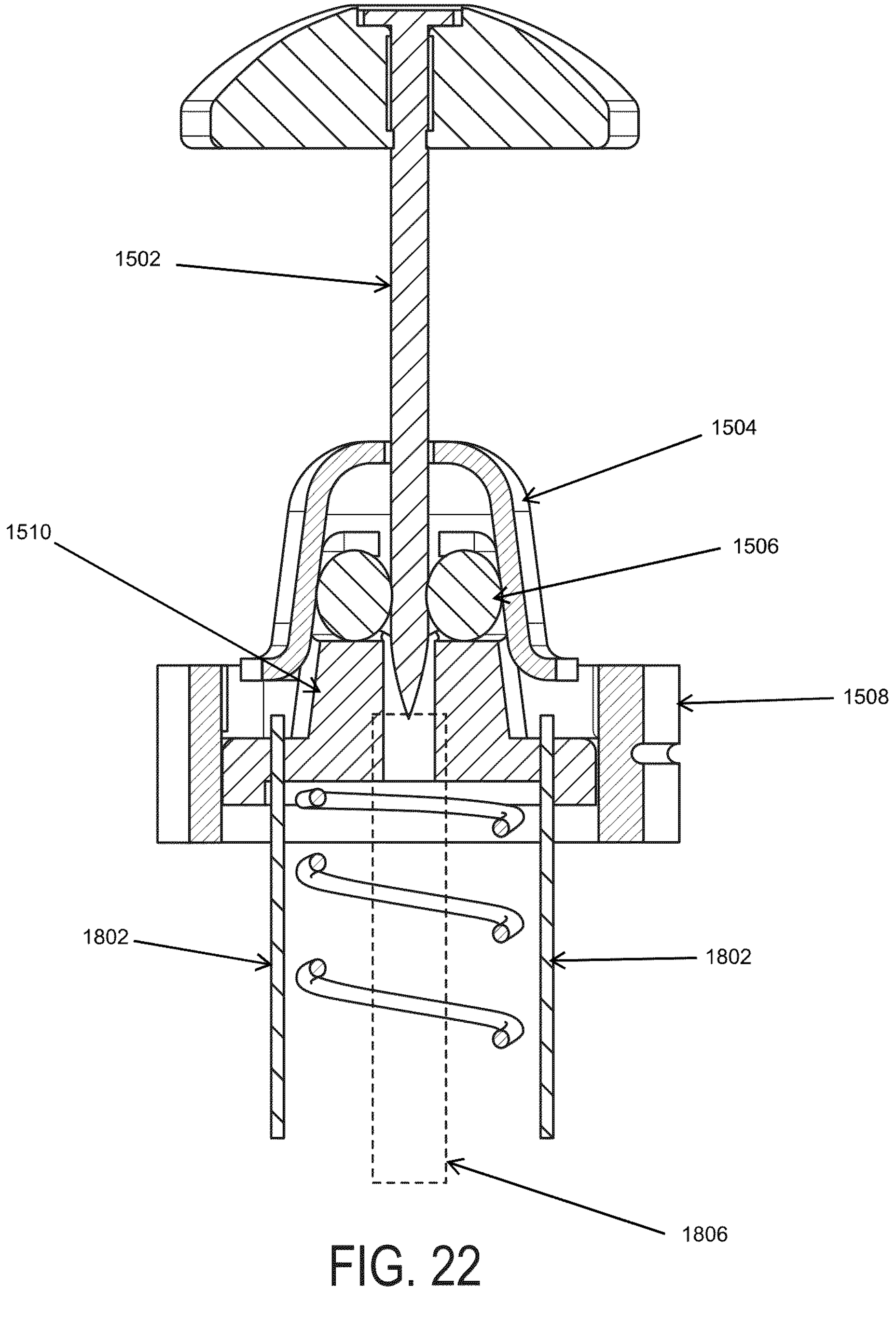
FIG. 22 is a cross-sectional view of the locking mechanism of FIG. 16.

Referring to FIGS. 17 and 22, an example of the connecting member 1502 engaged with the clutch mechanism (balls 1506 held by plunger member 1510 within the bell 1504, biased by the spring member 1518) further includes guide rails 1802 (note: not to scale in FIG. 22) extending from the lower housing 1704 and engaged with plunger member 1510 to limit the plunger member 1510 to move in a vertical direction substantially perpendicular to a plane of the rotational motion of the rotational drive member 1508. Alternatively, or in addition, the lower housing 1704 may include a cylindrical tube member 1806 extending therefrom that similarly restricts the movement of the plunger member 1510 to a substantially vertical direction. Though not illustrated, any other plurality of mechanisms to ensure the perpendicular motion of the plunger member 1510 with respect to the plane of rotation of the rotational drive member 1508 may be implemented, such as a plurality of nodes or protrusions, or other similar guide members, for example.

Figure 23:
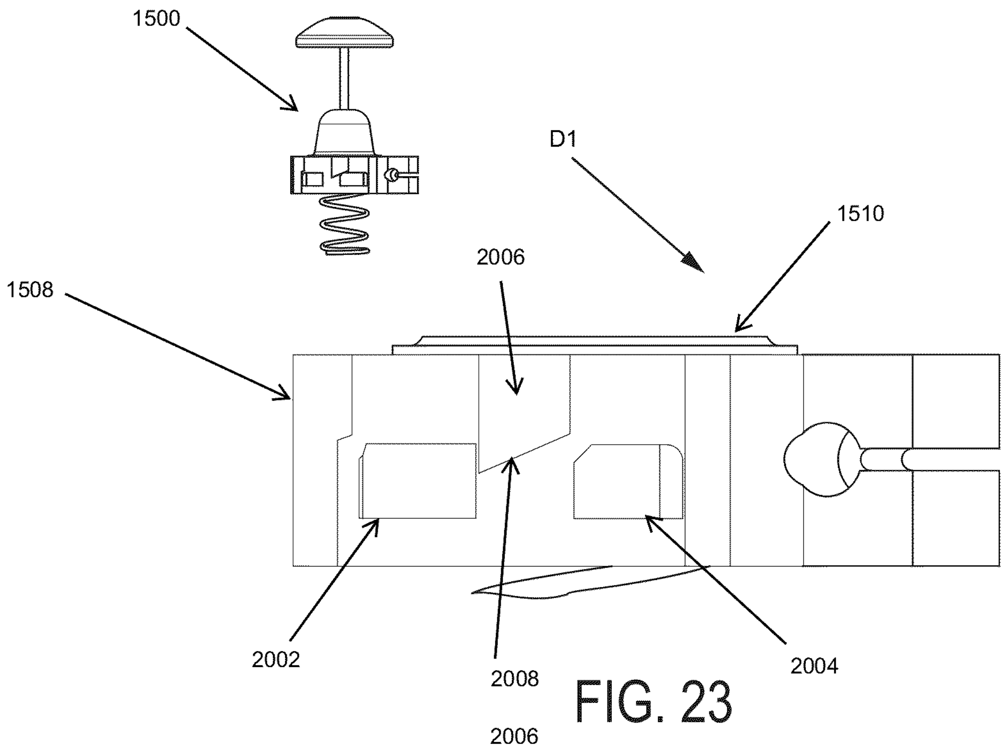
FIG. 23 is a partial cross-section view of a first rotational position, corresponding to a locked state, of the rotating locking mechanism of FIG. 16.
Figure 24:
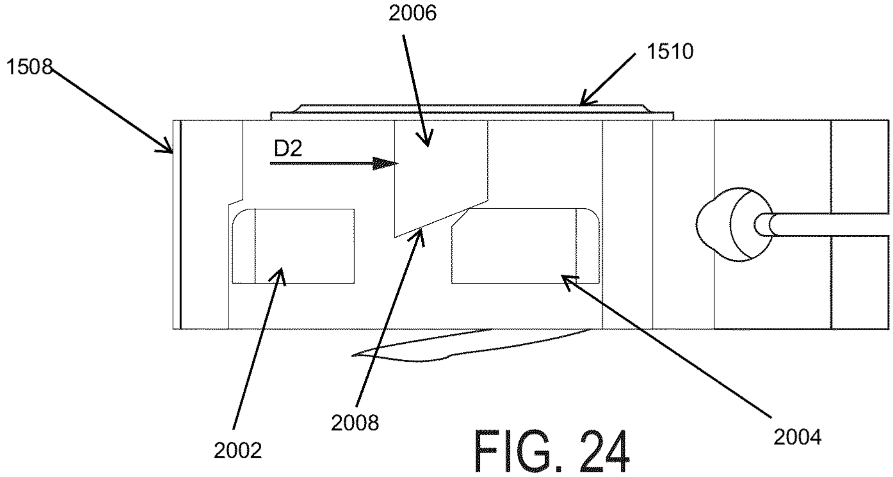
FIG. 24 is a partial cross-section view of a second rotational position of the rotating locking mechanism of FIG. 16.
Figure 25:
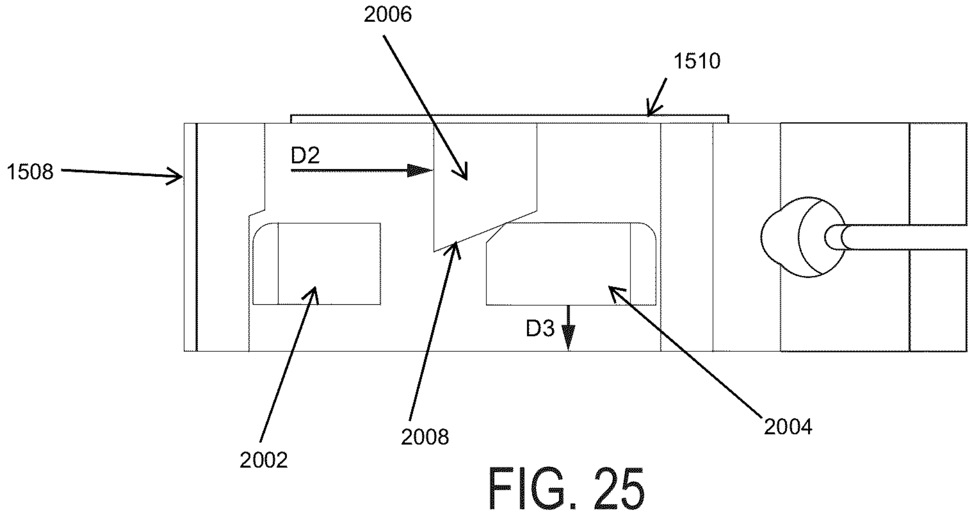
FIG. 25 is a partial cross-section view of a third rotational position, corresponding to an unlocked state, of the rotating locking mechanism of FIG. 16.

Referring to FIGS. 23, 24 and 25, examples of different rotational states, respectively unengaged/locked, engaged, and unlocked, of the rotational drive member 1508 occur during interoperating with plunger member 1510. In this example, protrusions 1514 of the rotational drive member 1508 are shown to interoperate with the protrusions 1516 of the plunger member 1510. Specifically, the rotational drive member 1508 is depicted with two visible protrusions, protrusions 2002 and protrusion 2004. Further, the plunger member 1510 is depicted with a single visible protrusion, protrusion 2006. When the rotation drive member 1508 rotates, the protrusion 2006 of the plunger member 1510 contacts the protrusion 2004 of the rotation drive mechanism, such that the protrusion 2006 is pushed down and parallel to the axis of the pin portion 1502 (not shown) via a force generated by the contact of protrusions 2004 and 2006. Thus, protrusions 2002, 2004, and 2006 may be configured to include angled face surface portions, such as angled face surface portion 2008, wherein the angled face surface portion facilitates the efficient translation of rotational motion into a motion substantially perpendicular to the plane of rotational motion. In one example, a value of the angle of the angled face surface portions, such as angled face surface portion 2008, may be optimized for efficiency. Further, the number of protrusions on both of the rotational drive member 1508 and the plunger member 1510 may vary. In one example, the rotation drive member 1508 and the plunger member 1510 each may include five protrusions, such that the five protrusions each form five distinct points of contact that may stabilize the vertical motion of the plunger member 1506 relative to the pin portion 1502. However, in another example, the rotational drive member 1508 and the plunger member 1510 may each include 3 protrusions. The number of protrusions included may be optimized for either the stability of the plunger member 1510 or for the conservation of energy in the transfer of rotational motion to linear motion.

Figure 26:
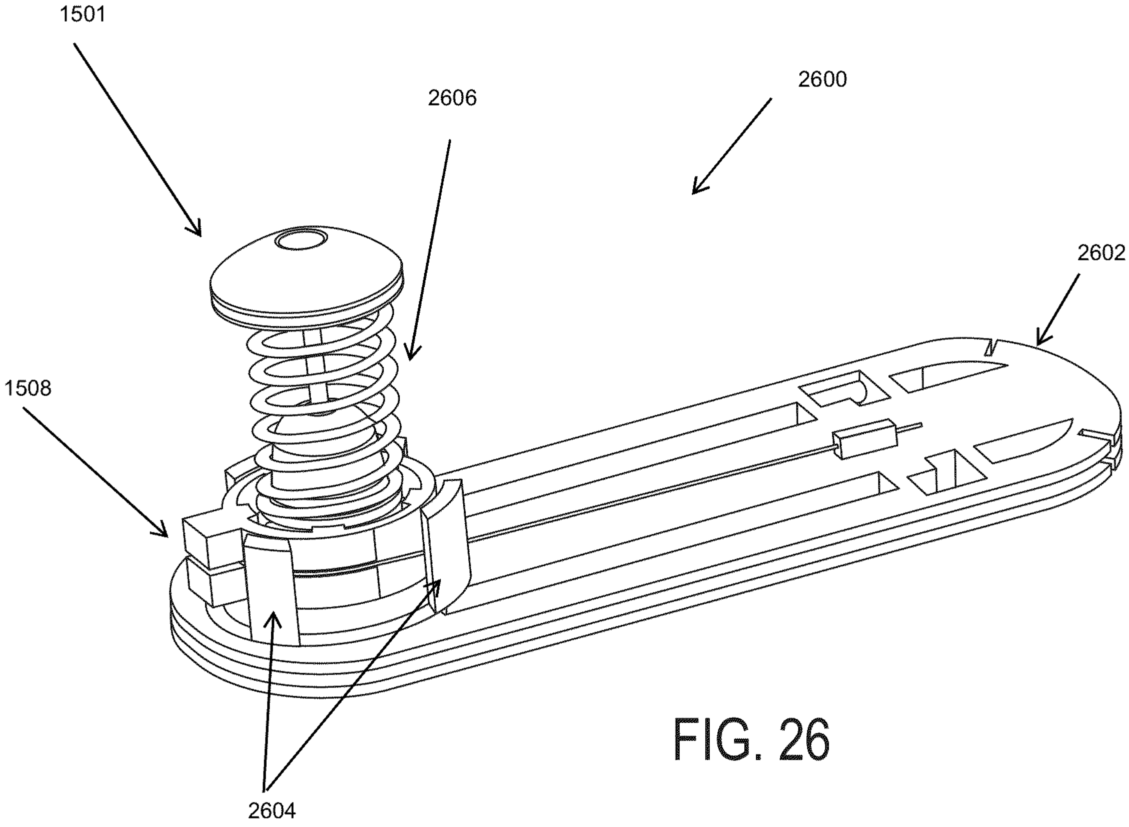
FIG. 26 is a perspective view of the rotating locking mechanism of FIGS. 16-25 mounted on a tag body member in accordance with aspects of the present disclosure.

Referring to FIG. 26, an example EAS tag body member 2600 includes the rotational drive member 1508 of FIG. 16 rotatably mounted within a base 2602 of the tag body member 2600, wherein the rotational drive member 1508 may be held in place by vertically extending arms 2604 connected to the base 2602. The vertically extending arms 2604 may allow the mechanism to rotate, but limit vertical motion. Further, the EAS tag body member 2600 may additionally include a spring 2606 to bias the connecting member 1501 toward the unlocked state.

Thus, referring to the aspects described above with respect to FIGS. 16-26, an example implementation includes an electronic security tag attachable to an item, comprising: a tag body member; a connecting member having a pin portion releasably engageable with the tag body member, the pin portion extending along a first axis; a locking member to lock the connecting member to the tag body member, wherein the locking member includes a clutch mechanism movable parallel to the first axis between a first position in contact with the pin portion and corresponding to a locked state and a second position corresponding to an unlocked state, wherein the clutch mechanism includes a plunger member comprising a plurality of first protrusions; and a rotational drive member comprising a plurality of second protrusions configured to interoperate with the plurality of first protrusions, wherein the rotational drive member is rotatable in a plane perpendicular to the first axis to move the plunger in a direction parallel to the first axis.

In addition, in the electronic security tag of the above example, the plunger member is configured to movably hold at least three balls of the clutch mechanism, wherein the at least three balls are arranged in a circular manner to receive the pin portion of the connecting member and engage the pin portion in the locked position to resist movement away from the tag body member.

In addition, in the electronic security tag of any of the above examples, the plunger member comprises a plunger member body having at least three capture recesses therewithin, wherein the at least three capture recesses are circumferentially spaced apart.

In addition, the electronic security tag of any of the above examples may further comprise a biasing member in contact with the plunger member and having a biasing force that biases the plunger member towards a top end of a bell shaped member of the clutch mechanism, which corresponds to the locked state.

In addition, in the electronic security tag of any of the above examples, the clutch mechanism further comprises a bell-shaped member having a closed top end and an inner surface defining an open bottom end configured to receive the at least three balls.

In addition, in the electronic security tag of any of the above examples, the plurality of first protrusions have a ramp shape, the ramp shape comprising at least one angled surface portion configured to interoperate with the plurality of second protrusions.

In addition, in the electronic security tag of any of the above examples, the plurality of second protrusions have a ramp shape, the ramp shape comprising at least one angled surface portion.

In addition, the electronic security tag of any of the above examples may further comprise a housing member configured to stabilize the rotational drive member and the plunger member when the clutch mechanism is moved between the locked state and the unlocked state.

In addition, in the electronic security tag of any of the above examples, the plunger member in the second position causes the pin portion to be released from the at least three balls to allow removal of the pin portion from the tag body.

In addition, in the electronic security tag of any of the above examples, the plunger member comprises at least one contact surface configured to receive a force to move the clutch mechanism from the first position to the second position.

In addition, in the electronic security tag of any of the above examples, the force is one of: a mechanical force on the plunger member exerted by an external device; a pulling force exerted by a shape metal alloy (SMA) wire coupled to the rotational drive member; and a motive force exerted by an electric motor.

In addition, in the electronic security tag of any of the above examples, the force is normal to the first axis.

In addition, in the electronic security tag of any of the above examples, the plunger member is formed from a non-ferromagnetic material.

In addition, the electronic security tag of any of the above examples may further comprise an actuator configured to rotate the rotational drive member; and an electrical controller configured to generate a signal to control the actuator to rotate the rotation drive member.

In addition, in the electronic security tag of any of the above examples, the actuator comprises an electrical controller.

In addition, in the electronic security tag of any of the above examples, the actuator comprises a magnetic induction coil.

In addition, in the electronic security tag of any of the above examples, the actuator comprises an antenna and circuit that converts wireless signals to energy.

In addition, in the electronic security tag of any of the above examples, the actuator comprises an electric motor driving a lead screw or gear.

In addition, in the electronic security tag of any of the above examples, the tag body member and the connecting member are connected in a unitary housing.

Figure 27:
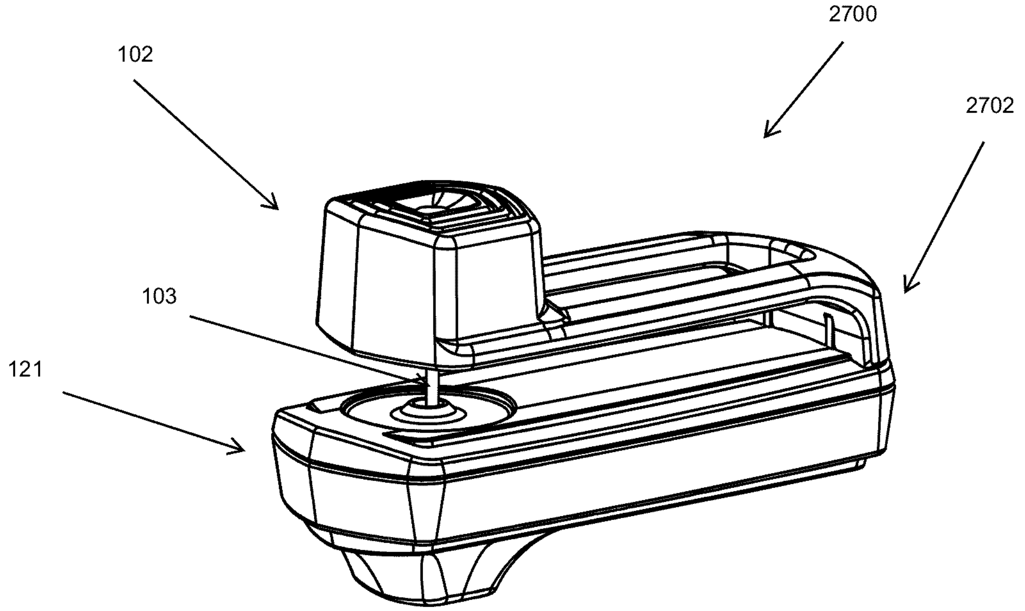
FIG. 27 is a front right perspective view of another example of electronic security tag having a one piece or unitary construction, and in a locked state.
Figure 28:
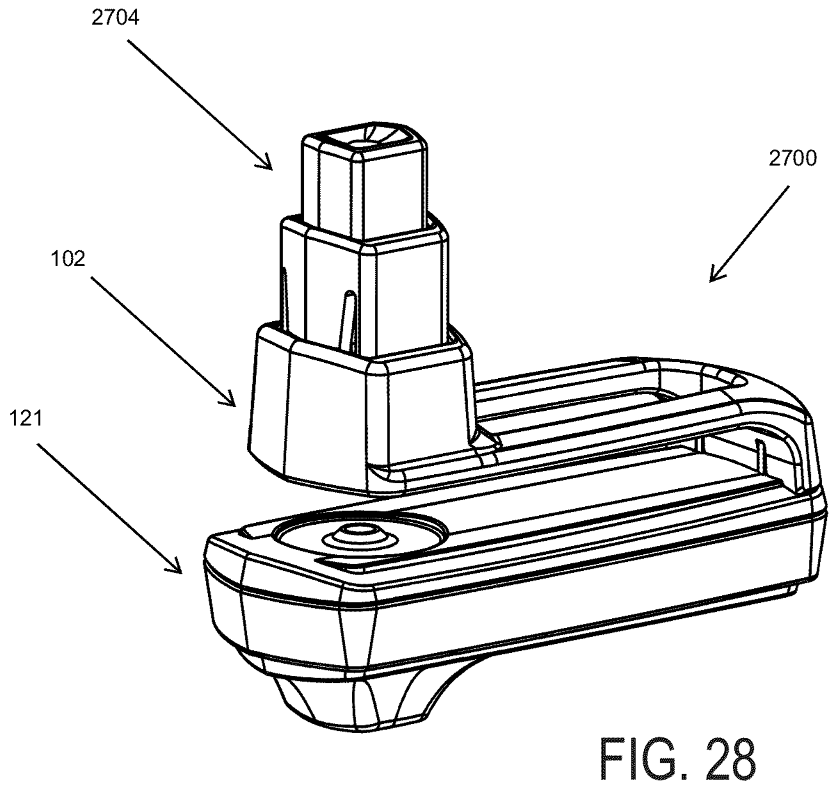
FIG. 28 is a front right perspective view of the electronic security tag of FIG. 27 in an unlocked state.
Figure 29:
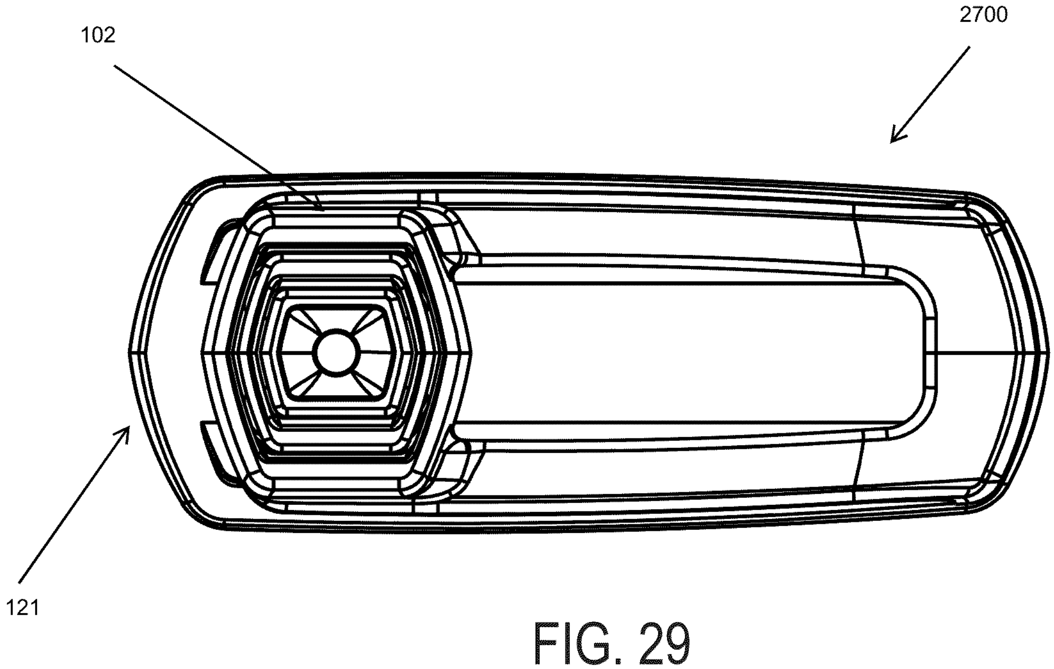
FIG. 29 is a top view of the electronic security tag of FIG. 27.
Figure 30:
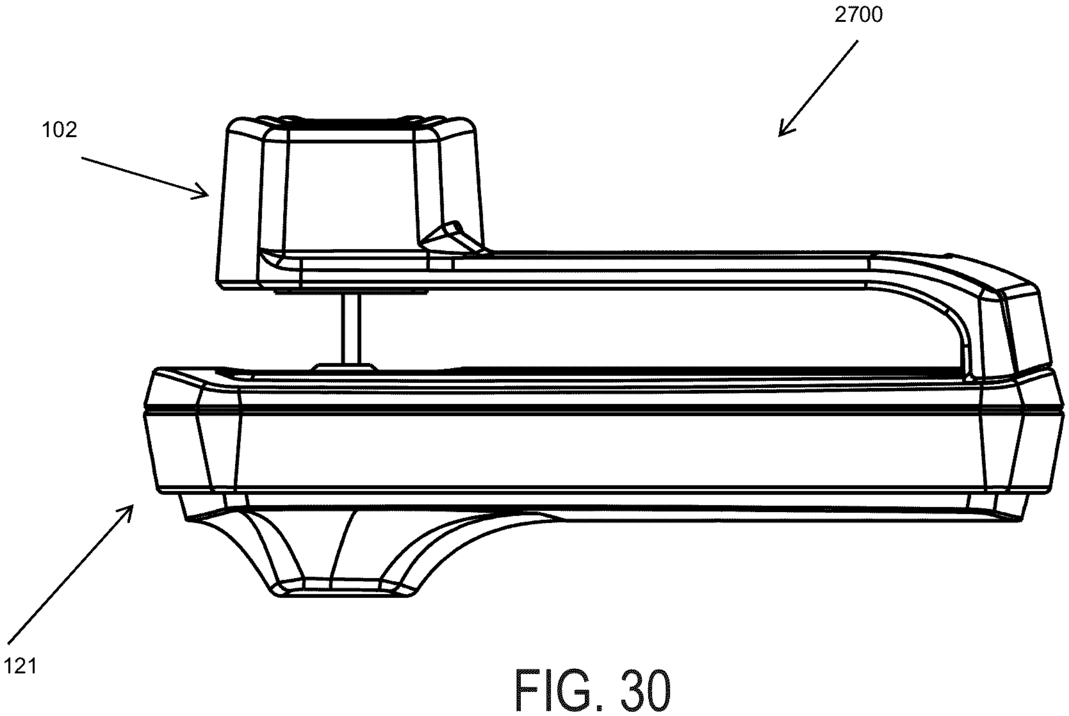
FIG. 30 is a right side view of the electronic security tag of FIG. 27.
Figure 31:
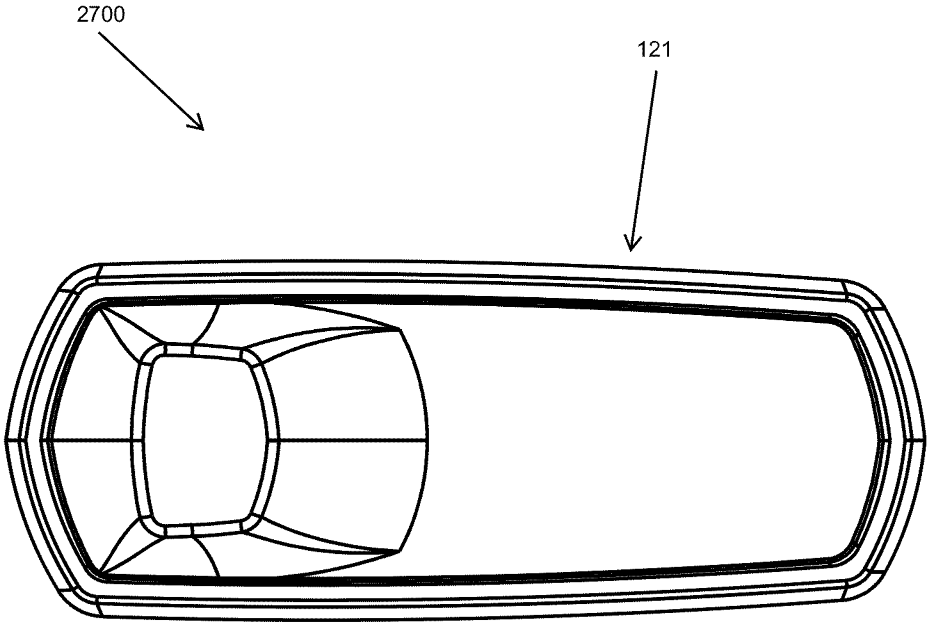
FIG. 31 is a bottom view of the electronic security tag of FIG. 27.

Referring to FIGS. 27-31, an example security tag 2700 includes a one piece or unitary form factor that may be alternatively utilized in any of the tags described above with respect to FIGS. 1-26. In security tag 2700, the connecting member 102 is fixedly attached to the tag member 121 by a flange member 2702. As such, in this case, the pin portion 103 is releasably attachable to the tag member 121 according to any of the above-described locking mechanism and unlocking mechanisms, which may be mounted within the tag member 121. In FIGS. 27 and 30, the security tag 2700 is in a locked state with the pin portion locked into the tag body 121, whereas in FIG. 28 the security tag 2700 in in an unlocked state with the pin portion 103 disengaged with the tag body 121. In the unlocked state of FIG. 28, the connecting member 102 includes a plurality of telescoping members 2704 that allow the pin portion 103 to become recessed within the telescoping members 2704 when in the unlocked state. For example, a spring, such as spring 2606 (FIG. 26) may be mounted within the plurality of telescoping members 2704 to bias the plurality of telescoping members 2704 to expand and thereby withdraw the pin portion 103 within the housing of the connecting member 102, thereby improving a safety of the security tag 2700 by not having the sharp end of the pin portion 103 exposed.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes disclosed is an illustration of example approaches. Based upon design preferences, it is understood that the specific order or hierarchy in the processes may be rearranged. Further, some features/steps may be combined or omitted. The accompanying claims present elements of the various features in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. An electronic article surveillance tag, comprising:

a tag body;

a locking member within the tag body and configured to receive and releasably engage with a pin portion of a connecting member and lock the connecting member to the tag body, wherein the locking member includes a clutch mechanism movable between a first position in fixed engagement with the pin portion and corresponding to a locked state and a second position corresponding to an unlocked state that allows detachment of the pin portion from the locking member, the clutch mechanism including a plunger member formed from a non-ferromagnetic material; and an unlocking member attached to and fully encased within the tag body, wherein movement of the unlocking member from a locked position to an unlocked position is configured to move the clutch mechanism between the first position corresponding to the locked state and the second position corresponding to the unlocked state.

2. The electronic article surveillance tag of claim 1, wherein the unlocking member and the locking member are encased within a same portion of the tag body.

3. The electronic article surveillance tag of claim 1, wherein the unlocking member is non-ferromagnetic.

4. The electronic article surveillance tag of claim 1, wherein the locking member is configured to receive and releasably engage with the pin portion of the connecting member along a first axis, and the unlocking member is moveable from the locked position to the unlocked position along a second axis that is not parallel with the first axis.

5. The electronic article surveillance tag of claim 4, wherein the clutch mechanism is configured to move parallel to the first axis between the first position and the second position.

6. The electronic article surveillance tag of claim 4, wherein the second axis is perpendicular to the first axis.

7. The electronic article surveillance tag of claim 1, wherein the unlocking member includes a rod that connects the unlocking member to the locking member.

8. The electronic article surveillance tag of claim 1, wherein the unlocking member includes a biasing member configured to bias the unlocking member toward the locked position.

9. The electronic article surveillance tag of claim 8, wherein the biasing member is a spring.

10. The electronic article surveillance tag of claim 1, wherein the locking member is configured to receive and releasably engage with the pin portion of the connecting member along a first axis, wherein the plunger member includes a first contact surface, wherein the unlocking member includes a second contact surface configured to slidably engage the first contact surface, and wherein the second contact surface comprises an angled surface relative to the first axis.

11. The electronic article surveillance tag of claim 10, wherein the first contact surface of the plunger member comprises an angled surface relative to the first axis.

12. The electronic article surveillance tag of claim 1, wherein the tag body includes a well portion defining a cavity, wherein the clutch mechanism is movable within the cavity, and further comprising a spring member between the clutch mechanism and the well portion to bias the clutch mechanism to move to the first position corresponding to the locked state.

13. The electronic article surveillance tag of claim 1, wherein the tag body further comprises an end configured to be received by a detacher mechanism.

14. The electronic article surveillance tag of claim 1, wherein the unlocking member includes an actuator.

15. The electronic article surveillance tag of claim 14, wherein the actuator comprises an electrical controller.

16. The electronic article surveillance tag of claim 14, wherein the actuator comprises a magnetic induction coil.

17. An electronic article surveillance tag, comprising:

a tag body;

a connecting member having a pin portion releasably engageable with the tag body, wherein the pin portion extends along a first axis;

a locking member attached to the tag body and configured to receive the pin portion to lock the connecting member to the tag body, wherein the locking member includes a clutch mechanism movable between a first position in fixed engagement with the pin portion and corresponding to a locked state and a second position corresponding to an unlocked state that allows detachment of the pin portion from the locking member, the clutch mechanism including a plunger member formed from a non-ferromagnetic material; and an unlocking member having a shape memory alloy component, wherein the unlocking member is positioned in the tag body and is moveable from a locked position to an unlocked position, wherein movement of the unlocking member from the locked position to the unlocked position moves the clutch mechanism between the first position corresponding to the locked state and the second position corresponding to the unlocked state.

18. The electronic article surveillance tag of claim 17, wherein the shape memory alloy component comprises a shape memory alloy wire having a first length in a first state corresponding to the locked position of the unlocking member and having a second length different from the first length in a second state corresponding to the unlocked position of the unlocking member.

19. The electronic article surveillance tag of claim 17, wherein the clutch mechanism moves between the first position and the second position along a second axis that is parallel to the first axis.

20. The electronic article surveillance tag of claim 19, wherein the unlocking member moves along a second axis that is not parallel with the first axis.

* * * * *